United States Patent
Ross

(10) Patent No.: US 6,421,600 B1
(45) Date of Patent: *Jul. 16, 2002

(54) ROADWAY-POWERED ELECTRIC VEHICLE SYSTEM HAVING AUTOMATIC GUIDANCE AND DEMAND-BASED DISPATCH FEATURES

(75) Inventor: Howard R. Ross, Richmond, CA (US)

(73) Assignee: H. R. Ross Industries, Inc., Richmond, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/583,455

(22) Filed: May 30, 2000

Related U.S. Application Data

(63) Continuation of application No. 09/429,835, filed on Oct. 29, 1999, now abandoned, which is a continuation of application No. 09/290,033, filed on Apr. 8, 1999, now abandoned, which is a continuation of application No. 09/126,913, filed on Jul. 30, 1998, now abandoned, which is a continuation of application No. 08/934,477, filed on Sep. 19, 1997, now abandoned, which is a continuation-in-part of application No. 08/238,990, filed on May 5, 1994, now Pat. No. 5,669,470.

(51) Int. Cl.[7] .................................................. B60L 9/00
(52) U.S. Cl. .......................... 701/117; 701/22; 701/24; 180/2.1; 180/167
(58) Field of Search ................................ 701/117, 207, 701/213, 22, 24; 342/357.01, 357.06, 357.09, 457; 180/167, 165, 2.1; 191/10, 2; 307/9.1

(56) References Cited

U.S. PATENT DOCUMENTS

| | | |
|---|---|---|
| 2,589,453 A | 3/1952 | Storsand |
| 3,673,379 A | 6/1972 | Eversuil .................. 219/202 |

(List continued on next page.)

FOREIGN PATENT DOCUMENTS

| | | |
|---|---|---|
| DE | 2161266 | 6/1973 |
| DE | 2740438 | 3/1979 |

(List continued on next page.)

OTHER PUBLICATIONS

Behrin, et al., "Energy Storage Systems for Automobile Propulsion: 1978 Study", *Lawrence Livermore Laboratory, 2. Detailed Report*, UCRL–52553, vol. 2, pp. 1–19 through 1–38 (Dec. 15, 1978).

(List continued on next page.)

*Primary Examiner*—Yonel Beaulieu
(74) *Attorney, Agent, or Firm*—Fitch, Even, Tabin & Flannery

(57) ABSTRACT

A roadway-powered electric vehicle (RPEV) system includes: (1) an all-electric vehicle; and (2) a roadway network over which the vehicle travels. The all-electric vehicle has one or more onboard energy storage elements or devices that can be rapidly charged or energized with energy obtained from an electrical current, such as a network of electromechanical batteries. The electric vehicle further includes an on-board controller that extracts energy from the energy storage elements, as needed, and converts such extracted energy to electrical power used to propel the electric vehicle. The energy storage elements may be charged while the vehicle is in operation. The charging occurs through a network of power coupling elements, e.g., coils, embedded in the roadway. The RPEV system also includes: (1) an onboard power meter; (2) a wide bandwidth communications channel to allow information signals to be sent to, and received from, the RPEV while it is in use; (3) automated garaging that couples power to the RPEV for both replenishing the onboard energy source and to bring the interior climate of the vehicle to a comfortable level before the driver and/or passengers get in; (4) electronic coupling between "master" and "salve" RPEV's in order to increase passenger capacity and electronic actuators for quick-response control of the "slave" RPEV; (5) inductive heating coils at passenger loading/unloading zones in order to increase passenger safety; (6) an ergonomically designed passenger compartment; (7) a locating system for determining the precise location of the RPEV; and (8) a scheduling and dispatch computer for controlling the scheduling of RPEV's around a route and dispatch of RPEV's based on demand.

27 Claims, 18 Drawing Sheets

U.S. PATENT DOCUMENTS

| | | | | |
|---|---|---|---|---|
| 3,914,562 | A | 10/1975 | Bolger | 191/10 |
| 3,938,018 | A | 2/1976 | Dahl | 370/2 |
| 4,007,817 | A | 2/1977 | Bolger | 191/10 |
| 4,031,449 | A | 6/1977 | Trombly | 320/2 |
| RE29,994 | E | 5/1979 | Bossi | 191/2 |
| 4,158,802 | A | 6/1979 | Rose | 320/2 |
| 4,218,624 | A | 8/1980 | Schiavone | 290/45 |
| 4,218,889 | A | 8/1980 | Buell | 60/676 |
| 4,236,594 | A | 12/1980 | Ramsperger | 180/167 |
| 4,254,843 | A | 3/1981 | Han et al. | 180/165 |
| 4,331,225 | A | 5/1982 | Bolger | 191/10 |
| 4,347,472 | A | 8/1982 | Lemelson | 320/2 |
| 4,350,287 | A | 9/1982 | Richards | 237/123 |
| 4,484,083 | A | 11/1984 | Jeffries | 290/45 |
| 4,495,836 | A | 1/1985 | Cohen | 74/751 |
| 4,583,505 | A | 4/1986 | Frank et al. | 123/198 |
| 4,588,040 | A | 5/1986 | Albright et al. | 180/165 |
| 4,629,947 | A | 12/1986 | Hammerslag et al. | 318/161 |
| 4,742,283 | A | 5/1988 | Bolger et al. | 318/587 |
| 4,800,328 | A | 1/1989 | Bolger et al. | 320/2 |
| 4,836,344 | A | 6/1989 | Bolger | 191/10 |
| 4,893,240 | A | 1/1990 | Karkouti | 364/424 |
| 5,000,139 | A | 3/1991 | Wong | 123/179 B |
| 5,049,802 | A | 9/1991 | Mintus et al. | 320/2 |
| 5,055,851 | A | 10/1991 | Sheffer | 342/457 |
| 5,113,427 | A | 5/1992 | Ryoichi et al. | 379/57 |
| 5,129,376 | A | 7/1992 | Parmley | 123/179.2 |
| 5,198,811 | A | 3/1993 | Potter et al. | 340/905 |
| 5,207,304 | A | 5/1993 | Lechner et al. | 191/10 |
| 5,223,844 | A * | 6/1993 | Mansell et al. | 342/357.01 |
| 5,244,054 | A | 9/1993 | Parry | 180/165 |
| 5,293,308 | A | 3/1994 | Boys et al. | 363/37 |
| 5,299,130 | A * | 3/1994 | Ono | 364/424.02 |
| 5,311,973 | A | 5/1994 | Tseng et al. | 191/10 |
| 5,669,470 | A * | 9/1997 | Ross | 191/10 |

FOREIGN PATENT DOCUMENTS

| | | |
|---|---|---|
| DE | 4115568 | 2/1993 |
| EP | 0253345 | 1/1988 |
| EP | 0289868 | 11/1988 |
| FR | 2387138 | 11/1978 |
| GB | 2020451 | 11/1979 |
| GB | 2191620 | 12/1987 |
| JP | 4124800 | 4/1992 |
| JP | 4271201 | 9/1992 |
| JP | 6-6903 | 2/1993 |
| WO | WO 95/30556 | 11/1995 |

OTHER PUBLICATIONS

Michael J. Riezenman, Senior Editor, "Special Report, Electric Vehicles", *IEEE Spectrum*, pp. 18–24 and 93–101, (Nov. 1992).

Dave Dooling, Contributing Editor, "Technology 1993, Transportation", *IEEE Spectrum*, pp. 68–71 (Jan. 1993).

Post, et al., "A High–Efficiency Electromechanical Battery", *Proceedings of the IEEE*, vol. 81:3, pp. 462–474 (Mar. 1993).

Post, et al., "Electromechanical Battery Research And Development at the Lawrence Livermore National Laboratory", $26^{th}$ *International Symposium on Automotive Technology and Automation*Aachen, Germany, pp. 1–9, (Sep. 13–17, 1993).

Ashley, "Flywheels Put a New Spin on Electric Vehicles", *Mechanical Engineering*, pp. 44–51 (Oct. 1993).

Brobeck, "Design Study for a Flywheel–Electric Car", *Conference Record of $28^{th}$ IEEE Vehicular Technology Conference*, pp. 145–152 (Mar. 22, 1978, New York).

* cited by examiner

ROADWAY-POWERED ELECTRIC VEHICLE SYSTEM HAVING AUTOMATIC GUIDANCE AND DEMAND-BASED DISPATCH FEATURES

This is a continuation application of U.S. Ser. No. 09/429,835, filed Oct. 29, 1999, now abandoned, which is a Continuation application of U.S. Ser. No. 09/290,033, filed Apr. 8, 1999, now abandoned, which is a Continuation application of U.S. Ser. No. 09/126,913, filed Jul. 30, 1998, now abandoned, which is a Continuation application of U.S. Ser. No. 08/934,477, filed Sep. 19, 1997, now abandoned, which is a Continuation-in-Part Application of U.S. Ser. No. 08/238,990, filed May 5, 1994, for ROADWAY-POWERED ELECTRIC VEHICLE, now U.S. Pat. No. 5,669,470, issued Sep. 23, 1997, all of which are incorporated herein by reference.

BACKGROUND OF THE INVENTION

The present invention relates to electric vehicles, and more particularly to an all-electric vehicle system that is powered from an onboard high-specific-power energy storage device, and that receives power to charge the energy-storage device inductively through coils in the roadway over which the vehicle travels. The invention further relates to enhancements included within such a roadway-powered electric vehicle system, such as an automatic position-determining system, automated vehicle guidance, demand-based vehicle dispatch, and the like.

In recent years, there has been an increasing emphasis on the development of an all electric vehicle (EV) or other zero emission vehicle (ZEV). The goal, as mandated by many governmental jurisdictions, is to have a certain percentage of all vehicles be zero-emission vehicles. Advantageously, zero-emission vehicles do not directly emit any exhaust or other gases into the air, and thus do no pollute the atmosphere. In contrast, vehicles that rely upon an internal combustion engine (ICE), in whole or in part, for their power source are continually fouling the air with their exhaust emissions. Such fouling is readily seen by the visible "smog" that hangs over heavily populated urban areas. Zero-emission vehicles are thus viewed as one way to significantly improve the cleanliness of the atmosphere.

In the State of California, for example, the California Air Resources Board (CARB) has mandated that by 1998 two percent of the vehicles lighter than 1700 kg sold by each manufacturer in the state be zero-emission vehicles. This percentage must increase to five percent by the year 2001, and ten percent by the year 2003.

A zero-emission vehicle, given the known, viable technologies for vehicle propulsion, effectively means that such vehicles must be all electric, or electric vehicles (EV's). Hence, if existing (and future) governmental mandates are to be met, there is an urgent need in the art for a viable EV that can operate efficiently and safely.

EV's are not new. They have existed in one form or another since the discovery of electrical batteries and electric motors. In general, EV's of the prior art are of one of two types: (1) those that—through rail or overhead wire—are in constant contact with an external source of electrical power (hereafter "externally-powered" EV's); or (2) those that store electrical energy in a battery and then replenish the stored energy when needed (hereafter "rechargeable battery-driven" EV's).

Externally-powered EV's require their own power delivery system, e.g., electrified rails or electrified overhead wires, that forms an integral part of their own roadway or route network. Examples of externally powered EV's are subways, overhead trolley systems, and electric rails (trains). Such externally-powered EV systems are in widespread use today as public transportation systems in most large metropolitan areas. However, such systems typically require their own highly specialized roadway, or right-of-way, system, as well as the need for an electrical energy source, such as a continuously electrified rail or overhead wire, with which the EV remains in constant contact. These requirements make such systems extremely expensive to acquire, build and maintain. Moreover, such externally-powered EV systems are not able to provide the convenience and range of the ICE automobile (which effectively allows its operator to drive any where there is a reasonable road on which the ICE vehicle can travel). Hence, while externally-powered EV systems, such as subway, trolley, and electric rail systems, have provided (and will continue to provide) a viable public transportation system, there is still a need in the art for a zero-emission vehicle (ZEV) system that offers the flexibility and convenience of the ICE vehicle, and that is able to take advantage of the vast highway and roadway network already in existence used by ICE vehicles.

Rechargeable battery-driven EV's are characterized by having an electrical energy storage device onboard, e.g., one or more conventional electrochemical batteries, from which electrical energy is withdrawn to provide the power to drive the vehicle. When the energy stored in the batteries is depleted, then the batteries are recharged with new energy. Electrochemical batteries offer the advantage of being easily charged (using an appropriate electrical charging circuit) and readily discharged when powering the vehicle (also using appropriate electrical circuity) without the need for complex mechanical drive trains and gearing systems. Unfortunately, however, such rechargeable battery-driven EV's have not yet proven to be economically viable nor practical. For most vehicle applications, such rechargeable battery-driven EV's have not been able to store sufficient electrical energy to provide the vehicle with adequate range before needing to be recharged, and/or to allow the vehicle to travel at safe highway speeds for a sufficiently long period of time. Disadvantageously, the energy density (i.e., the amount of energy that can be stored per unit volume) of currently-existing electrochemical batteries has been inadequate. That is, when sufficient electrical storage capacity is provided on board the vehicle to provide adequate range, the number of batteries required to provide such storage capacity is prohibitively large, both in volume and weight. Moreover, when such batteries need to be recharged, the time required to fully recharge the batteries is usually a number of hours, not minutes as most vehicle operators are accustomed to when they stop to refill their ICE vehicles with fuel. Further, most currently-existing electrochemical batteries are not suited for numerous, repeated recharges, because such batteries, after a nominal number of recharges, must be replaced with new batteries, thereby significantly adding to the expense of operating the rechargeable battery-driven EV. It is thus evident that what is needed is a rechargeable battery-driven EV that has sufficient energy storage capacity to drive the distances and speeds commonly achieved with ICE vehicles, as well as the ability to be rapidly recharged within a matter of minutes, not hours.

EV systems are known in the art that attempt to combine the best features of the externally-powered EV systems and the rechargeable battery-driven EV systems. For example, rather than use a battery as the energy storage element, it is known in the art to use a mechanically coupled flywheel, i.e., a flywheel that is mechanically coupled to vehicle's drive train, that is rapidly charged up to a fast speed at select locations along a designated route. See, e.g., U.S. Pat. No. 2,589,453 issued to Storsand, where there is illustrated an EV that includes a mechanical flywheel that is recharged via an electrical connection at a charging station.

Further, in U.S. Pat. No. 4,331,225, issued to Bolger, there is shown an EV that has an electrochemical battery as the preferred storage means, and that receives power from a roadway power supply via inductive coupling. An onboard power control system then provides the power to the storage means, and the storage means then supplies power as needed to an electric motor providing motive power for the vehicle. Bolger also indicates that the storage means could be a mechanical flywheel.

In U.S. Pat. No. 4,388,977, issued to Bader, an electric drive mechanism for vehicles is disclosed that uses a pair of electric motors as motive power for the vehicle. A mechanical flywheel is mechanically connected to the drive shaft of one of the electric motors. The vehicle receives power from an overhead power supply, e.g., trolley lines, and the motor then spools up the mechanical flywheel. The mechanical flywheel is then used to supply power to the motor at locations where there is not an overhead power supply.

In U.S. Pat. No. 5,224,054, issued to Parry, there is shown a bus-type vehicle having a continuously variable gear mechanism that uses a mechanical flywheel as a power source. The mechanical flywheel is periodically charged by an overhead connection to an electrical supply. The flywheel is mechanically linked to the drive shaft of the vehicle.

In the above systems, the mechanical flywheel is used as the energy-storage element because it can be charged, i.e., spooled up, relatively quickly to a sufficiently fast speed. Disadvantageously, however, the use of such mechanical flywheel significantly complicates the drive system of the vehicle, and also significantly adds to the weight of the vehicle, thereby limiting its useful range between charges. Further, the mechanical flywheel operating at fast speeds may present a safety hazard. What is needed, therefore, is an EV that avoids the use of a flywheel mechanically coupled to the vehicle's drive system. Further, what is needed is an EV that can receive electrical energy from an external source to rapidly recharge, within a matter of minutes, an onboard energy storage element. Moreover, what is needed is such an EV wherein the onboard energy storage element, once charged or recharged, stores sufficient energy to provide the motive force needed to safely drive the vehicle at conventional driving speeds and distances.

SUMMARY OF THE INVENTION

The present invention addresses the above and other needs by providing an improved roadway-powered electric vehicle system that includes: (1) an all-electric vehicle; and (2) a roadway network over which the vehicle travels. The all-electric vehicle includes one or more onboard energy storage elements or devices that can be rapidly charged or energized with energy obtained from an electrical current. The vehicle further includes an on-board power controller that extracts energy from the energy storage elements, as needed, and converts such extracted energy to electrical energy used to propel the electric vehicle. Advantageously, the energy storage elements of the vehicle may be charged while the vehicle is in operation. Such charging occurs, e.g., through a network of power coupling elements embedded in the roadway. As the vehicle passes over such power coupling elements, as it traverses the roadway network, electrical current is coupled to the electric vehicle, which electrical current is then used to charge the energy storage devices. Advantageously, such power coupling elements may be coils embedded at strategic locations in existing roadways and highways. Such embedding can be done at a very modest cost.

In a preferred embodiment, the power coupling elements embedded in the roadway comprise a network of coils connected to a conventional primary power source, e.g., single-phase, 2000 to 3500 Hz or 8500 to 9000 Hz electrical power generated by a power conditioner from three-phase 50 or 60 Hz, 480 volt power, as is readily available from public utility power companies or cooperatives. Advantageously, such coils need not be distributed along the entire length of the roadway, but need only be located at selected locations along the length of the roadway, amounting to, e.g., 10% or less of the entire length of the roadway, e.g., 1% of the roadway. A 2000 Hz to 3500 Hz, or 8500 to 9000 Hz alternating electrical current (ac current) is inductively coupled from the power coupling elements embedded in the roadway to a power pickup element carried on the vehicle as the vehicle passes over the power coupling elements. Such ac current, when received in the power pickup element on the vehicle, is then used to charge or energize the storage elements carried by the vehicle.

A power meter, carried onboard the vehicle, monitors how much power is transferred to or used by the vehicle. Hence, the public utility (or other power company) that provides the primary power to the power coupling elements embedded in the roadway (or otherwise located to couple power to the vehicle) is able to account for the electrical power used by the RPEV and to bill the vehicle owner an appropriate amount for such power, thereby recouping the cost of generating and delivering such electrical power.

In some embodiments, the rapid charge energy storage elements or devices carried onboard the electric vehicle comprise an electromechanical battery (EMB), or a group or network of EMB modules. An EMB is a special type of energy-storage device having a rotor, mounted for rapid rotation on magnetic bearings in a vacuum-sealed housing. Because magnetic bearings are used, the shaft of the rotor does not physically contact any other components. Hence, there is no friction loss in the bearings. Because the rotor is housed in a sealed, evacuated, chamber, there are no loses due to windage. As a result, the rotor—made from high-strength graphite-fiber/epoxy composite—is able to rotate at extremely high speeds, e.g., 200,000 rpm. Because the EMB's rotor is able to rotate at such speeds, high amounts of energy can be stored in a very compact or small volume representing a significant improvement in energy density relative to conventional electrochemical batteries.

In order to store energy in the EMB, and in order to extract energy therefrom, a special dipolar array of high-field permanent magnet material is mounted on the rotor. The resulting magnetic field from such array, extends outside of the sealed housing to cut through stationary, external coils, wound external to the housing. By applying an appropriate ac current to the external coils, the rotor is forced to spin. Because of the compactness and special design of the rotor, it is able to achieve high rotational speeds very rapidly (within minutes). Hence, the EMB may be charged to store a high amount of energy in a very short time, commensurate with the same time it takes to fill the gas tank of existing ICE vehicles.

Advantageously, the rapid charging EMB does not have any direct mechanical linkages with the vehicle's drive train.

Rather, the EMB is charged by simply applying an appropriate ac electrical signal to its terminals. Similarly, the EMB is discharged (energy is withdrawn therefrom) by simply using it as a generator, i.e., connecting its electrical terminals to a suitable load through which an electrical current may flow. Thus, the complexity of the charging components and the discharging components is greatly simplified, and the EMB appears, from an electrical point-of-view, as a "battery", having an electrical input and an electrical output.

In operation, the input ac voltage applied to the terminals of the EMB spools up the rotor of the EMB to a rate proportional to the frequency of the applied ac voltage, just as if the EMB were an ac motor. The energy stored in the EMB is in the form of kinetic energy associated with the rapid rotation of the rotor. When extracting energy, the rapid rotating magnetic field, created by the rapid rotation of the magnetic array on the rotor, cuts through the stationary windings, inducing an ac voltage, just as though the EMB were an ac generator. Such induced voltage thus represents the extracted energy. The extracted voltage, in turn, is then used, as needed, to drive the electrical motors that propel the vehicle. Thus, the EMB functions as a motor/generator depending upon whether electrical energy is being applied thereto as an input (motor), or withdrawn therefrom as an output (generator). Unlike a conventional motor/generator, however, the extremely high rotational speeds of the EMB rotor allow great amounts of energy to be stored therein—sufficient energy to provide the motive force for the EV over substantial distances and at conventional speeds.

Hence, without any direct mechanical linkage to the vehicle's drive train, the EMB can be electrically charged (i.e., its rotor is spun-up to rapid rotational velocities) using electrical current that is inductively coupled to the vehicle through the roadway over which the vehicle travels. Also without any direct mechanical linkage, the EMB can be electrically discharged (i.e., energy is withdrawn from the rapidly spinning rotor) by having the rotating magnetic field induce a voltage on the stationary windings, which induced voltage powers the electrical drive system of the vehicle.

Advantageously, an EMB may be manufactured as a standardized EMB module, and several EMB modules may then be connected in parallel, as required, in order to customize the available energy that can be stored for use by the EV to the particular application at hand. For example, a relatively small EV, equivalent in size and weight to a "sub-compact" or "compact" vehicle as is commonly used in the ICE art, may require only two to six EMB modules. A larger or more powerful EV, equivalent in size to a passenger van or high performance vehicle, may utilize 6 to 10 or more EMB modules. A still larger and more powerful EV, equivalent, e.g., to a large bus or truck, may utilize 12–20 or more EMB modules.

Standardizing the EMB module results in significant savings. The cost of manufacturing a standard EMB module, as opposed to many different types of EMB modules, is significantly reduced. Further, maintenance of the EV is greatly simplified, and the cost of replacing an EMB within the EV when such replacement is needed is low.

Additionally, a high operating efficiency is advantageously achieved when an EMB is used as the energy storage element. For example, in an EMB, the entire generator/motor assembly is ironless. Hence, there are low standby losses (no hysteresis effects). In combination with the frictionless magnetic bearings and windless evacuated chamber wherein the rotor spins, this means that the overall efficiency of the EMB should exceed 90%, and may be as high as 95% or 96%. Such high efficiencies result in significantly reduced operating costs of the EV.

When inductive coupling is used to transfer power from the power coupling element (e.g., coils) imbedded in the roadway to the power pickup element (e.g., coils) in the EV, the preferred coupling frequency of the ac current is in the 2000 to 35000 Hz or 8500 to 9000 Hz ranges. The use of such frequency, significantly higher than the conventional 60 Hz or 400 Hz ac signals that are commonly used in the prior art for power coupling purposes, advantageously optimizes the coupling efficiency of the power signal and operation of the EV system. Moreover, by using an ac signal within this frequency range, the magnitude or intensity of any stray magnetic fields that might otherwise penetrate into the vehicle or surrounding areas (as electrical power is inductively coupled into the vehicle) is significantly reduced. Having the magnetic fields that penetrate into the vehicle or surrounding areas be of low magnitude may be an important safety issue, at least from a public perception point-of-view, as there has been much debate in recent years concerning the possible harmful effects of over-exposure to magnetic field radiation. See, e.g., U.S. Pat. No. 5,068,543.

It is thus a feature of the present invention to provide an efficient, viable, safe, roadway-powered all electric vehicle.

It is an additional feature of the invention, in some embodiments, to provide such an EV that uses, with only minor modification, the existing network of highways, roadways, loading/unloading and/or garaging/parking facilitates that are already in place to serve ICE vehicles.

It is yet another feature of the invention, in some embodiments, to provide an EV system wherein the EV's of the system may be recharged while such EV's are in operation within the system. Hence, the EV's need not be taken out of service from the system in order to be recharged, as is common with prior art battery-storage type EV's.

It is an additional feature of the invention, in some embodiments, to provide an EV, or EV system, wherein the EV uses a high energy density battery or a group of such batteries as an onboard energy storage element. In one embodiment, the battery(s) are electromechanical batteries that due to the use of magnetic bearings and enclosing the rotor in a sealed vacuum chamber, are able to run at extremely high speeds (e.g., exceeding 100K-200K rpm), and thereby provide a large amount of power in a relatively small space.

It is a further feature of the invention, in some embodiments, to provide an EV system that powers a fleet of electrically-powered buses, or other mass transit electric vehicles, using a demand responsive charging system or scheme. In accordance with such scheme, existing highways and roadways over which the EV's travel are electrified only at select locations, such as: (1) at designated "stops" of the vehicle, e.g., at designated passenger loading/unloading zones, parking garages, or the like; (2) at locations where the vehicle regularly passes, such as roadway intersections; and/or (3) along selected portions of the route, e.g., 50–100 meters of every kilometer over which the vehicle travels.

It is still another feature of the invention, in some embodiments, to provide an EV system that uses inductive coupling to couple electrical power between embedded coils in the roadway and coils carried in a power pickup element carried onboard the EV. Such coupled electrical power is stored onboard the EV and is thereafter used to provide the motive force of the EV. In accordance with related embodiments of the invention, onboard systems and methods are provided that laterally and vertically position the relative spacing and alignment between the onboard coil and the coils embedded in the roadway in order to minimize the air gap between the coils and to maximize the alignment between the coils, thereby making the power transfer from the roadway to the vehicle more efficient. Moreover, using such onboard systems and methods, when the EV is stopped, the air gap may advantageously be minimized to zero.

It is an additional feature of the invention, in various embodiments, to provide an EV that utilizes an on-board control module to perform and coordinate the functions of: (i) receiving the inductive power from the coils embedded in the roadway, (ii) storing the received power as energy in the onboard storage elements, e.g., EMB's, and (iii) selectively extracting the stored energy to power the vehicle.

It is yet a further feature, in several embodiments, to provide an EV that includes an onboard power meter that monitors the amount of electrical power that has been transferred to the EV as it operates on the electrified network of highways and roadways, thereby providing a convenient mechanism for a utility company, that provides the electrical power to the electrified network of highways and roadways to recoup its energy costs.

In addition to the above-identified features, numerous add-on features may be included as part of the EV system to further enhance its viability. The add-on features may include, for example: (a) establishing a wide bandwidth communications channel with the EV's that permits numerous communications functions (such as telephone, video, roadway-condition communications, position information communications, and automated, demand-based dispatch) to be carried out via the embedded coils over which the vehicle travels and associated interconnecting power lines, or via a radio frequency communications link or the like; (b) providing fully automated garaging features that permit the onboard EMB's (and/or other storage elements) to be intelligently charged when the vehicle is parked overnight or at other times in a specially-equipped garage or parking area; (c) platooning of RPEV's by producing an electronic (cabled and/or radio frequency) or optical coupling between a plurality of roadway-powered vehicles, with one of the vehicles being a "master" or leader, and the others being "slaves" or followers that follow the master, to provide, in effect a roadway-powered "train"; (d) using inductive or ohmic heating coils, powered by the same power source that couples power into the vehicle from the roadway, to melt snow or ice in the vicinity of a passenger loading/unloading zone and/or from the surface of the power coupling element; (e) ergonomically designing a passenger compartment of the EV to facilitate passenger loading, unloading, seating, and safety; (f) using an onboard lateral guidance system to not only position the EV for optimal power transfer between the power coupling element and the power pickup element, but to position the EV for elevator-like platform loading (which can require controlling the position of the EV to within a few centimeters); (g) providing electronic actuators for steering and braking so that, when the EV is operating as a "slave" or follower, reaction time to command signals from the "master" or leader is minimized; (h) utilizing the wide-band communications system or the like, in combination with a scheduling and dispatch computer, for performing dispatch functions and the coordination of scheduling in a public transportation system based on demand; (i) precisely determining the position of the EV in response to a location signal from a global positioning system (GPS) or Differential GPS (dGPS) receiver, preferably in combination with a dead-reckoning (i.e., inertial) locating system, in order to (1) provide a backup position indication for electrically or optically coupled EV's, (2) provide either primary or backup position information for lateral alignment of the power pickup element over the power coupling element and/or for "elevator-like" platform loading; and (j) wayside control of the EV's through an "ATM-like" control station for (1) dynamically displaying scheduling information, (2) summoning free-roaming point-to-point EV's (i.e., taxis or limousines), and (3) providing demand-based scheduling including monitoring the number of passengers on an EV and adjusting dispatch/scheduling in response thereto; (k) maintaining communications with the EV during electronic garaging in order to communicate, e.g., to the vehicle's owner whether the vehicle has been tampered with; (1) providing a kneeling feature for public transportation EV's that lowers (or "kneels") the entire vehicle for loading/unloading, and simultaneously reduces the air gap between the power pickup element and the power coupling element to zero or near zero; and (m) providing for route memorization by recording a dGPS location signal as the vehicle manually driven over a route so that the vehicle can subsequently automatically navigate the route.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Broadly stated, the invention relates to a roadway-powered electric vehicle system that includes a network of highways and roadways that have been electrified at select locations, and a fleet of roadway-powered electric vehicles (RPEV's) that traverse the network of highways and roadways and receive their electrical operating power from the electrified highways and roadways. Many of the components that make up the RPEV system of the embodiments described herein are components that already exist and have been used for other types of EV systems, or other applications. Such components may be found, for example, and are described in the following documents, all of which are incorporated herein by reference: U.S. Pat. Nos. 4,629,947 (Hammerslag et al.); 4,800,328 (Bolger); 4,836,344 (Bolger); 5,207,304 (Lechner et al.); Ziogas, et al., "Analysis and Design of Forced Commutated Cycloconverter Structures with Improved Transfer Characteristics," *IEEE Trans. Ind. Elec.*, Vol. IE-33, No. 3, p. 271 et seq. (August 1986); Riezenman, *Special Report*, "Electric Vehicles," *IEEE Spectrum* (Nov. 1992, pp. 18–101; Post, et al., "A High-Efficiency Electromechanical Battery", *Proceedings of the IEEE*, Vol. 81, No. 3, pp. 462–474 (March 1993).

Figure 1:
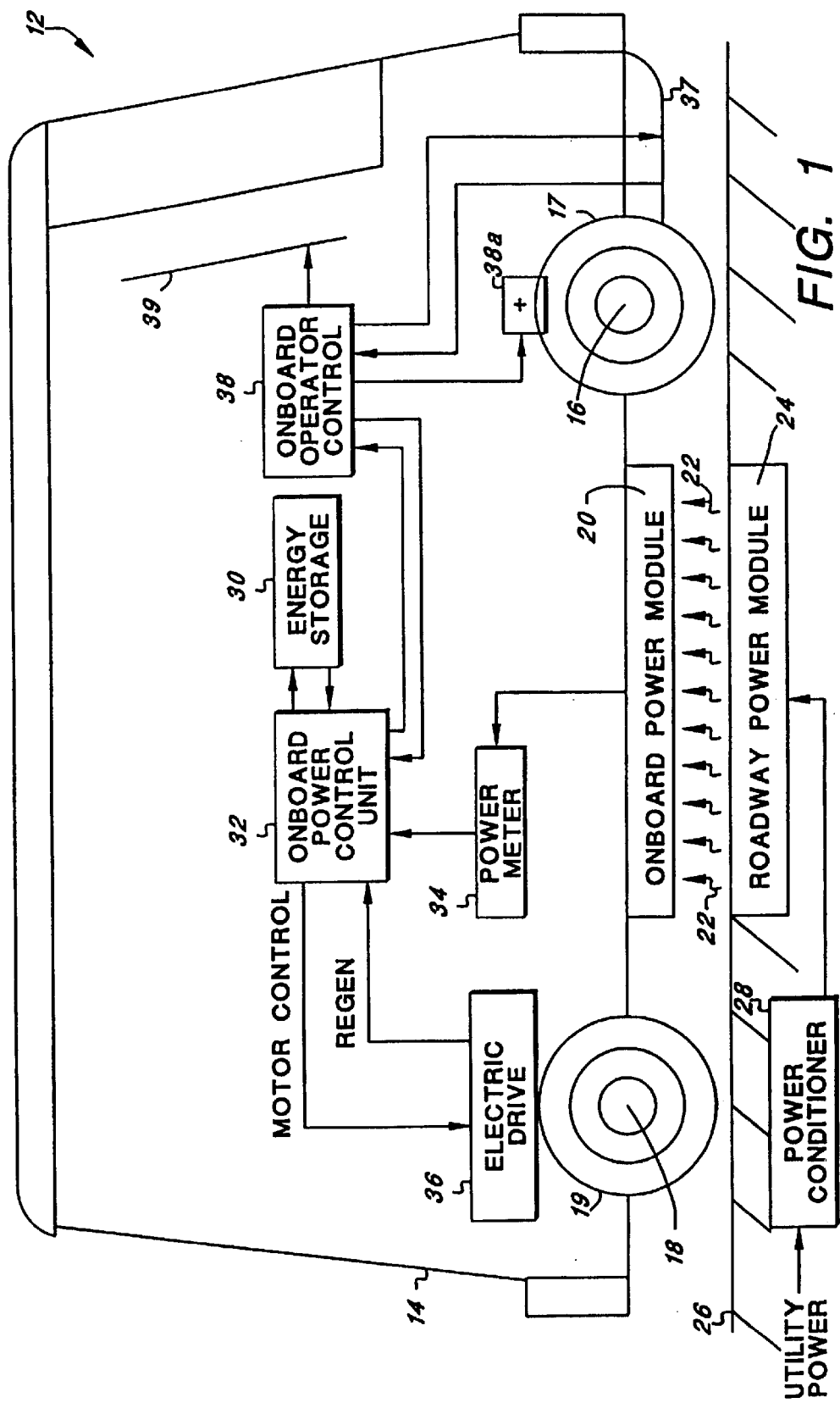
FIG. 1 is a block diagram of a roadway-powered electric vehicle (RPEV) of one embodiment of the invention.

Referring first to FIG. 1, there is shown a block diagram of a roadway-powered electric vehicle (RPEV) 12 made in accordance with one embodiment of the present invention. The RPEV 12 includes a vehicle frame 14 supported by a front suspension system 16, including front wheels 17, and a rear suspension system 18, including rear wheels 19. The frame 14 and suspension systems may be of conventional design. Mounted on the underneath side of the RPEV 14 is a power pickup element 20 (or onboard power receiving module). The power pickup element 20 receives electrical power, symbolically represented by the wavy arrows 22, from a power coupling element 24 (or roadway power transmitting module) embedded in a roadway 26 over which the RPEV travels. The roadway power transmitting module 24 receives power from a power conditioner circuit 28, which in turn is connected to a utility power distribution system, such as is provided by a public utility company. Typically, the utility company provides electrical power to most customers as 3-phase, 60 Hz power, at 220 vac. Higher voltages may be made available to some customers, as required, such as 480 volts ac (vac). The function of the power converter circuit 28 is to convert the 3-phase, 60 Hz power (at whatever voltage is provided) to an appropriate frequency and voltage for driving the roadway power transmitting module 24, as described in more detail below.

Electrical power received from the electrified roadway 26 (the term "electrified" is used herein to describe a roadway wherein a roadway power transmitting module 24, or a plurality of such modules, have been embedded) via the onboard power receiving module 20 is stored in an onboard energy storage system 30. The power is directed to such energy storage system 30 through an onboard power control unit 32 (or onboard power controller). Advantageously, a power meter 34 monitors all electrical power received by the onboard power module 20 so that the utility power company, or other agency, can bill the owner of the RPEV for the cost of such electrical power.

A key feature of the present embodiment is performance achieved from the onboard energy storage system 30, described more fully below. Such storage system exhibits a very high energy storage capacity, on the order of 10 to 15 Kw-h. Further, such energy storage capacity is provided in a very small volume, e.g., on the order of from 0.5 to 1 m$^3$, at an extremely low weight, thereby providing a very attractive energy density, on the order of from 20 to 30 kW-h/m$^3$; a high specific energy, on the order of 150 W-h/kg; and a high specific power, on the order of from 5 to 10 kW/kg. (Note that a conventional electrochemical battery, at best, can only provide a specific power of about 0.2 to 0.4 kW/kg; and an internal combustion engine only provides about 0.6 to 0.8 kW/kg.)

As described more fully below, the preferred element of the energy storage system 30 is an electromechanical battery (EMB) because it offers a specific power of up to 10 kW/kg, and offers a very high efficiency (power out/power in) on the order of 95% or higher. It is to be understood, however, that the present embodiment is not limited to the use of an EMB as the energy storage element. Any storage element which offers the specific power, efficiency, specific energy and other criteria set forth herein, may be used with the RPEV system of the present embodiment. At present, of the available energy storage devices, the EMB appears to best meet the stated criteria, and therefore it is the preferred energy storage element. However, it is contemplated that other high-energy-density energy storage elements, whether such elements comprise dramatically improved electrochemical batteries, ultra-capacitors, or other devices, will become available and that such other high-energy-density energy storage elements may be used in lieu of, or in combination with, the EMB's described herein.

The RPEV 12 also includes an electric drive 36 that provides the motive force for propelling the front and/or rear suspension systems 16, 18. The onboard power control unit 32, which is controlled by onboard operator controls 38 and/or automatic control features programmed into the power control unit 32, selectively directs electrical power from the energy storage system 30 to the electric drive 36. The electric drive 36, and operator controls 38, may incorporate designs and features as are commonly used in existing EV's, e.g., battery-powered EV's, or other EV's, as are known in the art. One such feature common to most EV's, and also applicable to the RPEV of the present embodiment, is that of regenerative braking. Regenerative breaking takes kinetic energy associated with the motion of the vehicle and redirects it back to the energy storage system 30 rather than having such energy be dissipated as heat, or in some other form, whenever it is necessary to brake the vehicle.

The onboard operator controls 38 are also coupled to a display panel 39 that provides information to a driver of the vehicle such as the current state of charge of the energy storage device 30, vehicle speed, and the like. In addition, the onboard operator controls 38 are coupled to electronic actuators 38a for steering and conventional (i.e., frictional) braking of the RPEV 12. Advantageously, the electronic actuators 38a provide much faster reaction times than achievable through conventional hydraulic system, and therefore facilitate platooning of multiple RPEV's and/or automated guidance of the RPEV 12. Use of the electronic actuators 38a for conventional braking and for steering is explained more fully below in reference to FIG. 14. The onboard operator control 38 may also coupled to an rf transceiver system 37, including an antenna that is used to provide a short range rf communications channel between the RPEV 12 and a wayside control system, as described more fully below in reference to FIG. 10.

Thus, as seen in FIG. 1, the RPEV receives its operating power through the electrified roadway 26, i.e., through the roadway power transmitting module 24; stores such power in a highly efficient energy storage system 30; and then uses such stored energy, as required, to drive the RPEV's electric drive 36. Advantageously, the RPEV 12 is all electric and has zero emissions.

Figure 2:
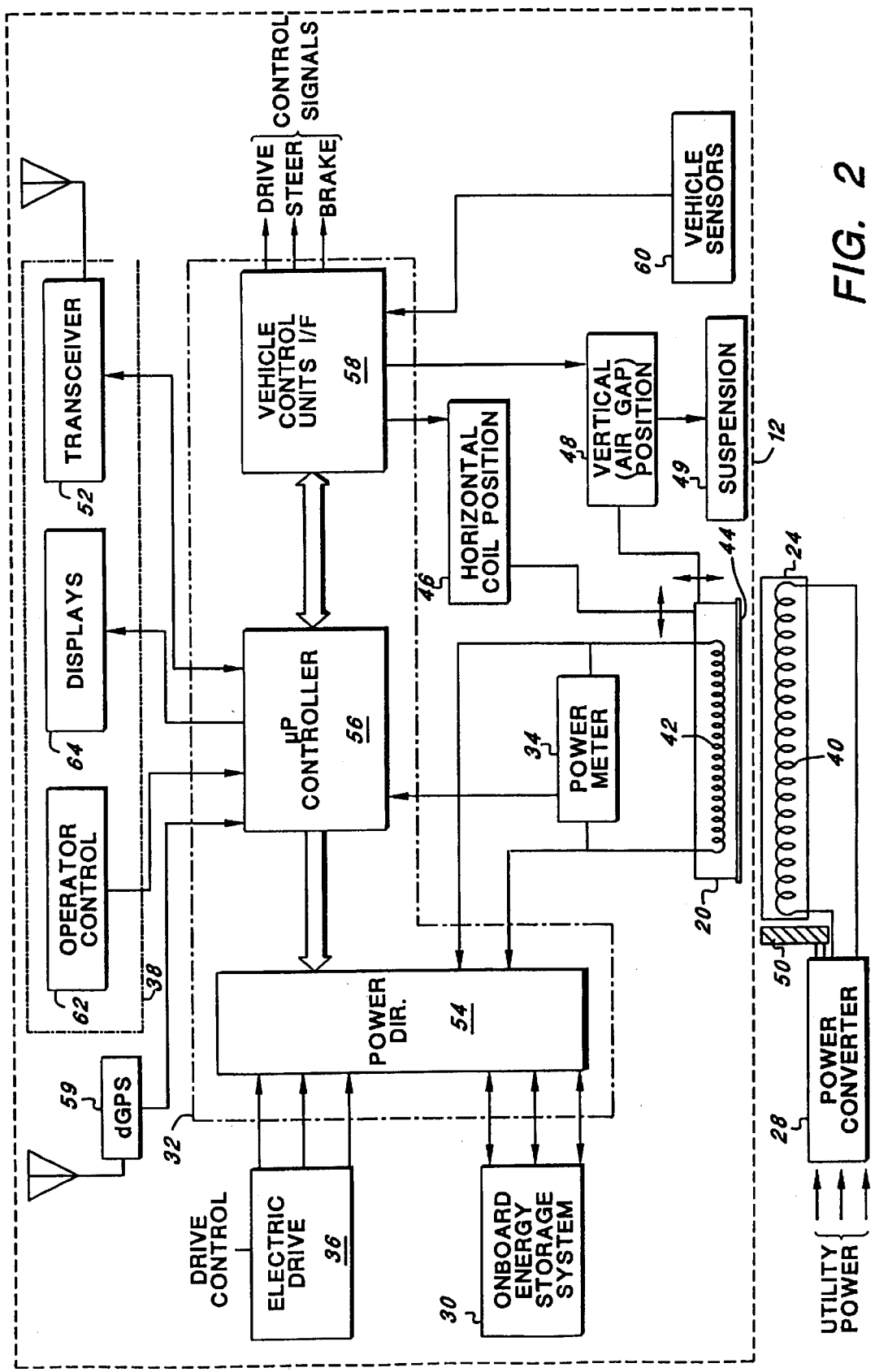
FIG. 2 is a more detailed block diagram of the RPEV of FIG. 1.

Referring next to FIG. 2, an electrical block diagram of the RPEV 12 and roadway power module 24 is shown. As seen in FIG. 2, the onboard power control unit 32 of the RPEV includes a power director 54, a microprocessor controller 56 and various vehicle control units 58. As further seen in FIG. 2, the roadway power transmitting module 24 is simply a coil 40. Such coil 40 is connected to the power conditioner 28. The preferred power conditioner 28 is a 3-phase, 60 Hz to 1-phase, f1 kHz converter, where f1 is a desired coupling frequency. Preferably, the coupling frequency is from between 2000 Hz and 3500 Hz or between 8500 Hz and 9000 Hz. Similarly, the preferred onboard power receiving module 20 is also a coil 42. When a suitable ac electrical current flows through the coil 40 at the coupling frequency f1, such current generates a magnetic field that varies at the coupling frequency f1. Such varying magnetic field cuts through the coil 42 and induces a voltage therein according to Faraday's law of induction. When the coil 42 is connected to a suitable load, an ac current is thus established in the coil 42 and power is effectively coupled from the coil 40 to the coil 42.

The coupling between the coils 40 and 42 is referred to as inductive coupling. It is the same type of coupling that occurs in a transformer, except that in a transformer the two coupled coils are closely physically coupled and are usually on the same magnetic core so that the coupling efficiency between the two coils is very high (i.e., all of the magnetic flux generated by the current in one coil cuts through the other coil). Where the coupled coils have an air gap between them, as occurs for this embodiment (with the coil 40 being embedded in the roadway, and the coil 42 being carried on the underneath side of the RPEV 12), the coupling efficiency is a function of the distance, or air gap, between the two coils 40 and 42, as well as the relative alignment between the coils.

In order to improve the coupling efficiency between the embedded coil 40 and the onboard coil 42, the present embodiment mounts the coil 42 on an assembly 44. The horizontal position of the assembly 44 is controlled by a horizontal coil position unit 46. Similarly, the vertical position of the assembly 44 may be controlled by a vertical (air gap) coil position unit 48. The vertical position may also, or alternatively, be controlled by an adjustable ride-height suspension 49 that causes the entire RPEV 12 to "kneel" or lower when it stops to load or unload passengers. This may be accomplished, for example, through the use of air shock absorbers, from which air can be released to lower the RPEV 12, or into which air can be pumped to raise the RPEV. Such kneeling not only lowers the RPEV's 12 height, thereby easing embarkation and debarkation, but also significantly reduces the air gap between the onboard power receiving module 20 and the roadway power transmitting module 24. Such adjustable ride-height suspension systems, or "kneeling" suspension systems, are well known in the automotive and mass transportation arts and are therefore not described in further detail herein.

The positioning units 36 and 48, in combination with the steering of the RPEV 12 and the adjustable ride-height suspension 49, allow the onboard coil 42 to be optimally aligned with the embedded coil 40 so as to provide the maximum possible coupling efficiency between the two coils 40, 42. Advantageously, when the RPEV 12 is stopped, for example, e.g., at a passenger loading/unloading zone, or at a signaled intersection, or when parked in a parking zone or garage, the air gap between the onboard coil 42 and the embedded coil 40 may be reduced to zero, or near zero, by "kneeling" the RPEV 12 and/or lowering the movable assembly 44 until it contacts the surface of the roadway 26 where the roadway power transmitting module 24 is embedded. Such reduction in the air gap, coupled with optimum lateral alignment of the assembly 44 relative to the embedded coil 40, allows a maximum amount of power to be coupled from the embedded coil 40 to the onboard coil 42. Even when the air gap between the two coils is not zero, however, as when the RPEV 12 is simply driving over the electrified roadway, some power is still coupled from the embedded coil 40 to the onboard coil 42. In order to maximize coupling when the RPEV 12 is moving, the coils 40, 42 are oriented predominantly lengthwise (or longitudinally) relative to the RPEV 12. Thus, as the coils 40, 42 pass over one another maximum coupling is maintained for a maximum amount of time. Such lengthwise alignment of the coils 40, 42 is described below in reference to FIG. 5C. Thus, the RPEV 12 is capable of receiving some power from the electrified roadway 12 simply by having the RPEV 12 drive over or on the electrified roadway.

Two ways of coupling power from the embedded coil 40 to the onboard coil 42 may be used. First, the embedded coil 40 may be continuously energized with an appropriate power signal generated by the power converter 28. Only when the onboard coil 42 comes near the embedded coil 40, however, is significant power transferred through the inductive coupling link. This is because the RPEV 12 represents the electrical load that receives the coupled electrical power. When the load is not present, as when the RPEV is not over the electrified roadway, then there is nowhere for the electrical power to go, and no power transfer (or very little power transfer occurs). This is analogous to having a load, or not having a load, attached to the secondary winding of a transformer. When the load is attached, power is transferred to the load through the transformer. When the load is not attached, no power is transferred to the secondary winding, and no power (other than the power associated with magnetic field losses) is transferred.

A second way of coupling power from the embedded coil 40 to the onboard coil 42 is to incorporate a vehicle sensor 50 into the roadway power module 24. The sensor 50 senses the presence of the RPEV 12, and in response to such sensing, activates the power converter 28 to energize the embedded coil 40. If the RPEV is not sensed, then the power converter 28 is not turned on. Thus, using such sensor 50, only when an RPEV 12 is present on the roadway 26 is the roadway 26 electrified. The sensor 50 may be a conventional vehicle sensor that senses the presence of any vehicle driving on the roadway, e.g., a pressure switch sensitive to weight, an inductive strip or loop, or a magnetic or an optical sensor, as are commonly used in the art to sense vehicles and other large objects. Alternatively, the sensor 50 may be a "smart" sensor that senses only RPEV's and not other types of vehicles. A smart sensor is realized, for example, by incorporating a conventional rf or optical receiver in the sensor 50 that receives a particular type of identifying signal (rf or optical) that is broadcast by a transceiver 52 carried onboard the RPEV 12, or by employing an optical scanner as part of the roadway sensor 50 that senses or "reads" a bar code placed on an underneath side of the vehicle as the vehicle passes thereover.

Regardless of the manner in which power is inductively coupled to the RPEV 12 through the coils 40 and 42, an important consideration for such inductive power transfer is the coupling frequency (referred to as "f1" above). Such coupling frequency is the dominant system parameter in the RPEV since the alternating current is fundamental to the inductive coupling energy transfer principle, and it affects the size, weight, cost, acoustic noise, flux density and efficiency of the various energy handling systems. Further, the coupling frequency interacts with all of the other system variables in relationships that are generally complex and non-linear. Coupling frequency is thus a basic parameter that appears in the specification for every piece of electrical and electronic apparatus aboard the RPEV 12.

The importance of the coupling frequency can be further appreciated by recognizing that heretofore only two standard power frequencies have existed for several decades, one at 50 or 60 Hz, which is the universal industrial and household standard, and the other at 400 Hz, which is an aircraft standard adopted to reduce size and weight. Neither frequency, however, is optimum for the RPEV system of the present embodiment.

The above "standard" frequencies of 50 or 60 Hz or 400 Hz, termed for purposes of this application to be relatively "low" frequencies, offer some advantages, particularly in the transmission of power over transmission lines of substantial length. For purposes of the RPEV of the present embodiment however, it has been determined that a "higher" frequency, in the kHz range, e.g., between 1 and 10 kHz. Between 8500 Hz and 9000 Hz is the most optimum frequency to use for transferring power through the inductive coupling link and within the RPEV to power the RPEV and to minimize losses. The EMB, while operating at variable frequencies, operates at a nominal frequency of around 3000 Hz. Thus, a frequency between 2000 Hz and 3500 Hz may also be desirable. (Note, if the rotor of the EMB is synchronized with a 3000 Hz driving signal, then it is rotating at 180,000 rpm.) Further, on the utility side of the energy transfer, i.e., at the power converter 28, converting the input power from the utility (typically 3-phase, 480 vac, at 60 Hz) to a single phase signal at 3000 Hz or 9000 Hz can be achieved in a commercially-available power converter.

Another important consideration for using an inductive coupling frequency of around 9000 Hz or 3000 Hz is the strength or intensity of the stray magnetic fields that might otherwise penetrate into the RPEV as a result of the electromagnetic fields associated with the inductive coupling. As indicated above, there are some safety concerns, or at least perceived safety concerns, at present regarding whether exposure to such electromagnetic fields posses a health risk. While there exists no direct evidence confirming such health risk, many who have studied the issue have concluded that the prudent thing to do is to avoid exposure to strong electromagnetic fields. See, e.g., "Electromagnetic Fields", Consumer Reports, pp. 354–359 (May 1994). Advantageously, by using a coupling frequency of around 9000 Hz or 3000 Hz, the strength of the magnetic fields within the RPEV is generally less than 1 mG (milligauss), which is no greater than the background magnetic fields that are present in a typical U.S. home.

Still referring to FIG. 2, it is seen that the power received through the onboard coil 42 is monitored by the power meter 34. The power meter 34 forms an important part of the present embodiment because it provides a means for a power utility company, or other electrical power provider, to monitor power usage and thus collect payment for the electrical power provided to power the RPEV. As such, the power meter 34 is preferably mounted so that it is tamper proof and so that it cannot be bypassed, similar to the power meters that are installed in most commercial and residential facilities. Similarly, although not mandatory, it is preferred that the power meter 34 include means for downloading the power measurements ("power data") that have been made. As described more fully below, included on the RPEV 12 is communications system including, e.g., the transceiver 52, that permits information to be sent to and from the RPEV 12 from/to a location remote from the RPEV. Such communications system may, by way of example, communicate via the power transmitting module 24 and other sensors/transducers associated therewith or via the RF communications channel coupled through the onboard operator control 38. When such communications system is used, the power data from the power meter 34 may be transmitted from the RPEV. Once downloaded, such power data is preferably directed to the power utility company. The power utility company is then able to bill the appropriate owner of the RPEV for the electrical power that has been used.

In some configurations, the RPEV 12 includes an identification data signal that is transmitted from the vehicle each time that electrical power is coupled thereto when the RPEV is stopped, and therefore when the assembly 44 has been lowered to reduce the air gap to near zero. Before electrical power is transferred, the RPEV identification data signal is verified, and power data is read from the power meter.

Another signal that may be transmitted from the vehicle is a location signal. The location signal is generated by a location system 59 in response to one or more location determining subsystems. Such subsystems may include any of a plurality of known location determining subsystems, such as a Global Positioning System (GPS) receiver, a Differential Global Positioning System (dGPS), a LORAN receiver, and/or a dead reckoning or inertial positioning system, or the like. The location system can be used by a communications control and monitoring station, described below, to determining whether the RPEV 12 is properly located, e.g., on schedule, and can also be used onboard the RPEV 12, in combination with the microprocessor controller 56 and electronic actuators 38a to steer the RPEV 12 for optimal positioning over the roadway power transmitting module 24.

Advantageously, in addition to steering the RPEV over the roadway power transmitting module 24, the location signal can be used by the RPEV 12 to precisely position its doors adjacent to a loading platform. Such positioning can be accurate to within a few centimeters when a dGPS receiver in combination with a dead reckoning system is used to determine position. As a result, platform loading similar to the loading of a elevator (i.e., "elevator-like" platform loading) can be performed, thereby facilitating access by the disabled, and the elderly.

Power received through the onboard coil 42 is coupled through a power director 54 to the onboard energy storage system 30. Also coupled to the power director 54 is the electric drive train 36. It is the function of the power director 54, as its name implies, to direct power to and from the onboard energy storage system 30 and the electric drive train 36. Power is initially directed, for example, from the onboard coil 42 to the energy storage system 30. Power is also directed, as required, from the energy storage system 30 to the electric drive train 36. Regenerative power may also be directed, when available, from the electric drive train 36 back to the onboard energy storage system 30.

The power director 54 is controlled by the microprocessor controller 56. The microprocessor controller 56, which is realized using a conventional processor-based system, such as the Motorola 68000 series, or the Intel 386/486/PENTIUM series of processors, both of which are well documented in the art, has appropriate RAM/ROM memory associated therewith wherein there are stored numerous operating routines, or programs, that define various tasks carried out by the microprocessor controller 56. Many such tasks are the same as are carried out with the operation of any EV. For purposes of the present embodiment, the most significant tasks carried out under control of the microprocessor controller 56 relate to directing the power to and from the energy storage system (explained below in conjunction with FIG. 3), controlling the lateral and vertical position of the assembly 44 on which the onboard coil 42 is mounted and the steering of the RPEV 12 to optimally position the RPEV 12 for power transfer, receiving appropriate commands from the operator control devices 38, and monitoring onboard vehicle sensors 60.

The operator control devices 38 include both operator control input devices 62 and vehicle displays 64. The input control devices include, e.g., manual switches or controls that determine speed, direction, braking, and other controls, associated with the manual operation or driving of the RPEV. Such devices are of conventional design and operation. The displays 64 are also of conventional function and design, indicating to the operator such parameters as vehicle speed and the status of the energy storage system 30.

The operator input control devices 62 generate input signals to the microprocessor controller 56. The microprocessor controller 56, in turn, responds to such input signals by generating appropriate output signals that are directed to a set of vehicle control units 58. The vehicle control units 58 perform the function of interface (I/F) units that convert the signals output from the microprocessor controller 56, which are digital signals, to the requisite signals for actually effectuating the desired control. Thus, for example, a braking signal may be sent from the operator control 62 to the microprocessor controller 56. The microprocessor controller 56 would process the braking control signal in an appropriate manner relative to the current status of the RPEV, e.g., speed, direction, etc., as determined by the vehicle sensors 60, and would determine the appropriate amount of braking needed. It would then send its output signal to a braking control unit (one of the control units 58), which would convert it to an appropriate analog electrical signal. The analog electrical signal is then directed to an electronically actuated braking mechanism, i.e., a braking servo motor, that applies the appropriate pressure to the vehicle's braking system. Similar processes are carried out for driving the vehicle at a desired speed, steering the vehicle, and the like with electronic actuators, such as servo motors or stepper motors, also being preferred for steering of the vehicle.

Some of the "driving" functions of the RPEV, although often under manual control of the operator through the operator control devices 38, may also be automated, or controlled by the microprocessor controller 56 in accordance with a prescribed or preprogrammed regime. For example, a key feature of the RPEV of the present embodiment is to incorporate lateral, as well as vertical (air gap) positioning of the assembly 44 on which the coil 42 is mounted. Thus, as the operator of the RPEV approaches, e.g., a passenger loading/unloading zone, he or she activates an auto-positioning function that effectively takes over the driving of the vehicle for the final 10 to 15 feet. Once the auto-positioning function is activated, the vehicle sensors 60 sense the position of the RPEV 12 relative to the roadway power transmitting module 24 embedded in the roadway. The steering of the vehicle is then controlled by the microprocessor controller 56 so that the vehicle is laterally positioned, to within a rough tolerance, e.g., ±5 to 10 cm, of the optimum lateral position when the vehicle comes to its designed stopped location. Once stopped, the horizontal coil positioning unit 46, typically realized, e.g., using conventional hydraulic and/or electronic positioning devices, further controls the lateral position of the coil 42 so that it is more closely aligned, e.g., to within ±1–2 cm, of the optimum lateral position. Once the assembly 44 has been aligned laterally, or concurrent with the lateral alignment of the assembly 44, the vertical (air gap) positioning unit 48, also typically realized, e.g., by kneeling the RPEV using the ride-height adjusting suspension 49, thus reducing the air gap, and then, using conventional hydraulic and/or electronic positioning devices to lower the assembly 44 so as to further reduce the air gap to near zero.

With the air gap near zero, the onboard energy storage system 30 is charged with additional power obtained from the power converter 28 through the inductive coupling link (which operates at maximum efficiency with a near zero air gap). Before the RPEV is allowed to move, i.e., before the RPEV can be driven away from the passenger loading/ unloading zone, the vertical positioning unit 48 raises the assembly 44 back to its normal position on the underneath side of the RPEV frame and the ride-height adjusting suspension 49 raises the RPEV 12 to a height appropriate for travel.

The vehicle sensors 60 comprise a variety of different types of sensors that sense all of the parameters needed for proper operation of the RPEV. Such sensors sense, e.g., temperature, lane position, distance from nearest vehicle or object, and the like. For purposes of laterally positioning the assembly 44, such sensors are typically optical sensors that look for markers placed on the roadway power transmitting module 24 embedded in the roadway. Other types of sensors may also be used for this purpose, including acoustic, mechanical, and electromagnetic sensors.

When the RPEV is traveling (being driven) on an electrified portion of a highway or roadway, the lateral (horizontal) positioning device 46 is also activated so that the coil 42 can maintain, to within a rough tolerance, an optimum lateral position relative to the coil 40 that is embedded in the roadway. In such instances, and optionally even when the vehicle is stopped, instead of using the sensors 60, or in combination with using the sensors 60, to sense the relative lateral location of the coil 42 to the coil 40, the approximate lateral position may be determined by monitoring the change in the amplitude of the inductively received power signal as the coil 42 is laterally moved in one direction or the other. The microprocessor controller 56 then laterally positions the coil 42, using the horizontal coil positioning unit 46 and/or the steering of the RPEV, to maintain the coil 42 at a lateral position that keeps the induced power signal at a peak or maximum level.

Figure 3:
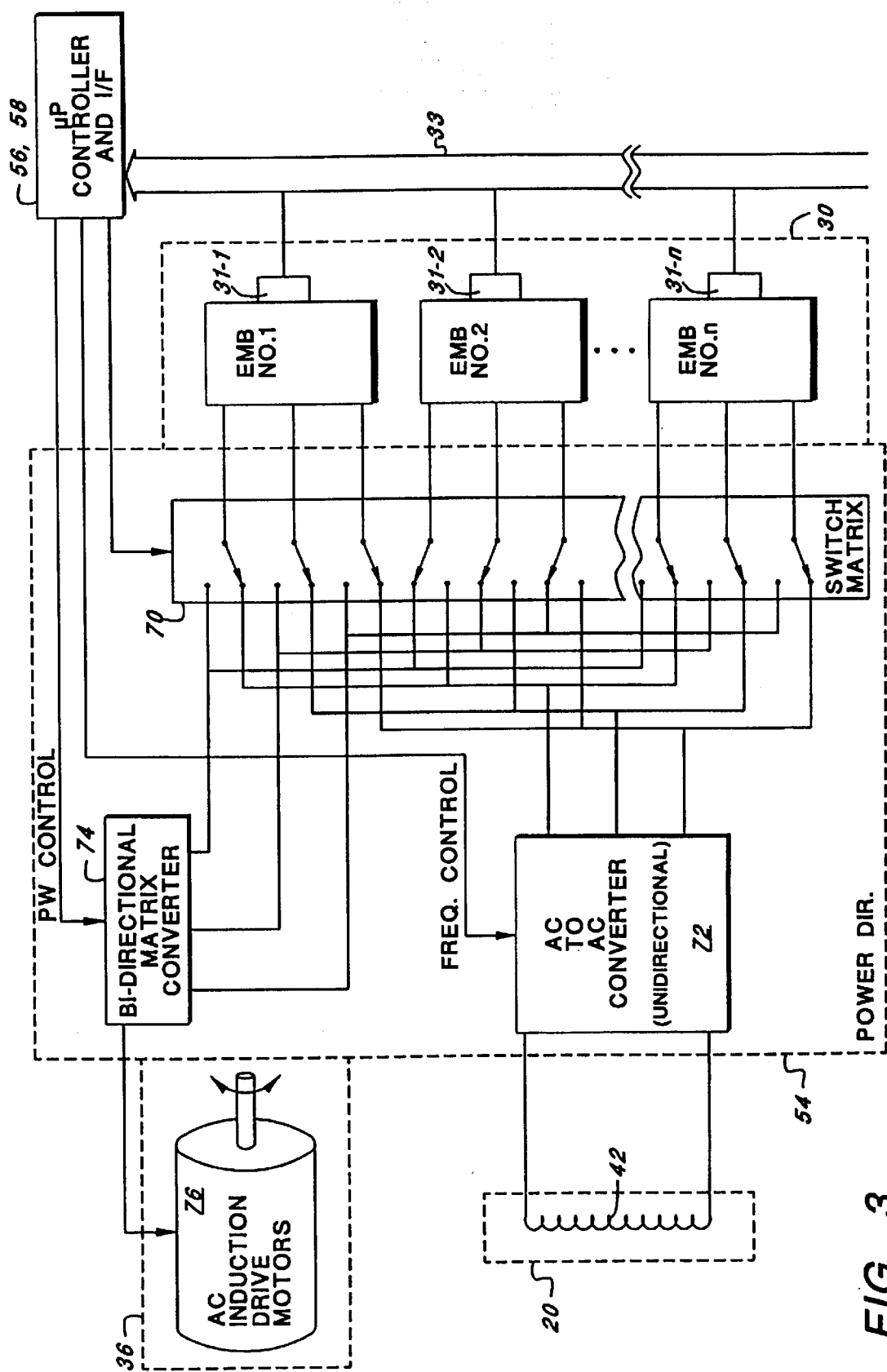
FIG. 3 is a block diagram of an on-board power director shown in FIG. 2, and illustrates how an on-board energy storage system in FIG. 2 is realized using a plurality of electromechanical battery (EMB) modules or other high-energy-density energy storage devices.

Turning next to FIG. 3, a block diagram of the onboard power director 54 and the onboard energy storage system 30 is shown. As seen in FIG. 3, the preferred onboard energy storage system 30 comprises a plurality of electromechanical battery (EMB) modules, labeled EMB-1, EMB-2, . . . EMB-n. Each EMB module is constructed as described below in conjunction with FIGS. 8 and 9A and 9B. The power director includes a switch matrix 70, a unidirectional ac-to-ac converter 72, and a bidirectional matrix converter 74. The bidirectional matrix converter 74 is connected to the electric drive train 36, which includes one or more ac induction drive motors 76. The ac-to-ac converter 72 is connected to the onboard receiving coil 42 through which inductively coupled electrical power is received.

Each EMB includes three power terminals, representing the 3-phase signals that are applied thereto (when the EMB is being charged), or extracted therefrom (when the EMB is acting as an ac generator). A set of switches, one set for each EMB, connects each power terminal of each EMB to either the ac-to-ac converter 72 (when electrical power is being applied to the EMB to charge it) or the matrix converter 74 (when electrical power is being extracted from the EMB and applied to the induction drive motors 76 that form part of the electric drive train 36; or when regenerative electrical power is being applied back to the EMB from the motors 76).

The unidirectional ac-to-ac converter 72 is of conventional design. The power signal received through the coil 42 comprises a single phase, e.g., 3000 Hz signal. This signal is rectified, and then chopped with an appropriate frequency control signal(s), provided by the microprocessor controller 58, to create a 3-phase signal of varying frequency. Each phase of the 3-phase signal thus generated is applied to the switch matrix 70 so that each phase may, in turn, be selectively applied to the respective input terminal of each EMB of the energy storage system. Each EMB is charged (energy is stored therein) by applying a 3-phase signal thereto that causes the rotor of the EMB to spin at the frequency of the applied signal. By applying a 3000 Hz, 3-phase signal, for example, to the terminals of the EMB, a rotating magnetic field is established within the EMB that rotates at a rate of 3000 revolutions per second, or 180,000 revolutions per minute (rpm). If the rotor is stopped when such a signal is applied, then it spools up to the speed corresponding to the applied frequency, representing the storage of energy. If the rotor is rotating at a speed less than the speed corresponding to the applied frequency, then the rotor speed increases to match the speed dictated by the applied frequency, representing the storage of additional energy. If the rotor is rotating at a speed greater than the speed corresponding to the applied frequency, then the rotor speed decreases to match the speed dictated by the applied frequency, representing a decrease in the energy stored in the EMB. Thus, the key to spooling up, or charging, a given EMB to increase the energy stored therein is to apply a signal thereto having a frequency corresponding to a rotor speed that is greater than the present rotor speed.

In view of the above, one of the main functions of the microprocessor controller 56 is to monitor the rotor speeds of each EMB within the energy storage system 30 so that when an input signal is received through the onboard coil 42, it can be converted to a 3-phase signal having an appropriate frequency sufficiently high so that it will increase the present EMB rotor speed, thereby storing additional energy in the EMB. To this end, each EMB includes a means 31 for determining its rotor speed, shown functionally in FIG. 3 as the speed sensors 31-1, 31-2, . . . 31-n. Each of the speed sensors 31-1, 31-2, . . . 31-n is coupled to the microprocessor controller 56 through a suitable bus 33. In practice, a separate rotor speed sensor is not needed, as the rotor speed of each EMB may be determined by simply sampling the ac signal generated by the EMB when operating in a generator mode. However, in order to emphasize the importance of sensing the EMB rotor speed (which provides a measure of the energy stored therein), separate functional speed sensors are shown in FIG. 3.

The bi-directional matrix converter 74 performs the function of taking the 3-phase signals generated by each EMB (when functioning as an energy source, or generator) and converts such signals as required in order to drive the ac induction motors 76 included in the electric drive train 36. When the RPEV is braking, or coasting (e.g., going down hill), the matrix converter 74 also performs the function of taking any energy generated by the motors (which, when the RPEV is braking or coasting, are really functioning as generators) and reapplying such energy to the EMB's of the energy storage system 30. The matrix converter 74 may be as described, e.g., in Ziogas, et al., "Analysis and Design of Forced Commutated Cycloconverter Structures with Improved Transfer Characteristics", *IEEE Trans. Ind. Elec.* Vol. IE-33, No. 3, 271 (August 1986).

The switch matrix 70 performs the function of a plurality of switches that connect the set of power terminals of each EMB to either the matrix converter 74 or the ac-to-ac converter 72. Such switch matrix may take various forms, including electrical relays, solid stake switches, SCR's, diodes, and the like.

One of the advantages of using the EMB as the basic building block of the energy storage system 30 is that each individual EMB may be of a standard size and design. A conventional EMB, for example, is designed to provide an energy capacity of 1 kW-h. By using fifteen such EMB modules in parallel, as shown in FIG. 3, the overall energy capacity thus increases to 15 kW-h. For smaller, lighter, RPEV's, only a few EMB's are needed to power the vehicle, e.g., 2–6. For larger, heavier RPEV's, such as trucks and vans, more EMB's are needed, e.g., 6–10, or more. For even larger RPEV's, such as buses, further EMB's are added as required, e.g., 12–20, or more.

The specifications of a typical RPEV made in accordance with the present embodiment are as shown in Table 1.

TABLE 1

Specifications of Typical Roadway-Powered Multiple Occupancy All Electric Vehicle

| Item | Description |
|---|---|
| UTILITY POWER | 480 vac, 60 Hz, 3-phase |
| POWER CONDITIONER | Input: 480 vac, 60 Hz, 3-phase Output: 225 kW, 3 or 9 kHz, 1-phase |
| ROADWAY POWER TRANSMITTER MODULE | 3 or 9 kHz, 300 amps, 200 kW. Module Length: 3 meters |
| ONBOARD POWER RECEIVING MODULE | 3 or 9 kHz, 200 kW; Mounted on movable assembly to provide multiple pickup positions |
| ONBOARD POWER CONTROLLER | Functions: Motor Controller; Regeneration Management; Pickup Power Control; Onboard Energy Storage Control; Monitoring State of Change; Metering Energy Consumption |
| ONBOARD ENERGY STORAGE | 15 kW-h (15 1 kW-h modules @ 10 kW each, 3 kHz (nominal) |
| ELECTRIC DRIVE TRAIN | Two 35 kW AC Motors |
| MULTIPLE OCCUPANCY VEHICLE (MOV) DESIGN FEATURES | 10–15 seated passengers; 110 km/h max speed; low floor; platform loading; electric propulsion; electronic guidance; electronic coupling. |
| ONBOARD CONTROL SYSTEM | Functions: electronic steering; lateral guidance control; electronic coupling and platform control; vehicle diagnostics; vehicle ID; "throttle" control; brake control; speed profile control; route control; vehicle "flight recorder". |
| ROADWAY CONTROL ELEMENTS | Functions: roadway-vehicle communication; lateral guidance signal; speed markers; vehicle ID interrogation; roadway surface condition sensors. |

Figure 4:
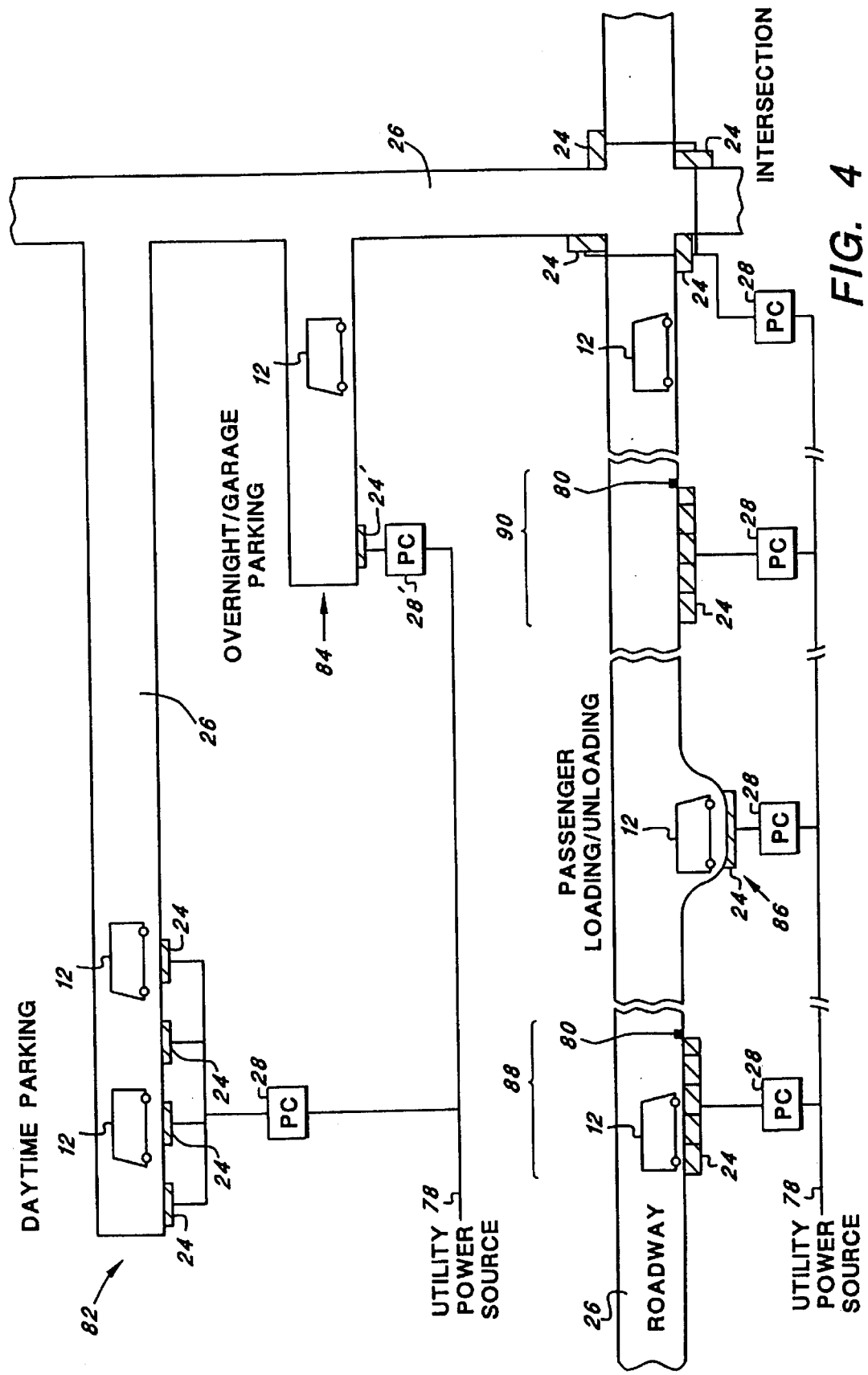
FIG. 4 schematically illustrates a roadway-powered EV system employing a plurality of RPEV's, such as shown in FIG. 1.

Turning next to FIG. 4, there is shown a schematic illustration of a roadway-powered electric vehicle (RPEV) system made in accordance with the present embodiment. The RPEV system includes a network of roadways and highways 26, selected portions of which have been electrified with a roadway power transmitting module 24, over which a fleet of RPEV's 12 may travel. Each roadway power transmitting module 24 is connected to a utility power source over suitable power lines 78, as previously described.

As indicated above in Table 1, the roadway power transmitting modules 24 are typically about 3 meters in length. For many locations of the roadway/highway network, a single module 24 is all that is required in order to efficiently couple to an RPEV that is above it. At other locations, e.g., along a section where there is no planned stopping of the RPEV's, such as areas 88 and 90, several modules 24, laid end-to-end, will be needed. Thus, at parking locations 82, or in an overnight parking garage area 84, or even at a passenger loading/unloading zone 86, and other locations where it is anticipated that the RPEV will be stopped for a sufficient charging time, a single power transmitting module of 3 meter length is all that should be needed. In fact, for a garage/parking situation, a shortened (e.g., 1–2 meters) power transmitting module 24' can normally be employed and still provide adequate coupling with the parked RPEV. Further, at strategic locations throughout the network of roadways/highways 26, various sensors 80 may be positioned to provide an indication of roadway surface conditions. Such information may be transmitted to the RPEV's 12 through conventional means, e.g., rf transmission; or through modulation of the power signal transmitted over the primary power line 78 and inductive coupling link with each vehicle.

Figure 5A:
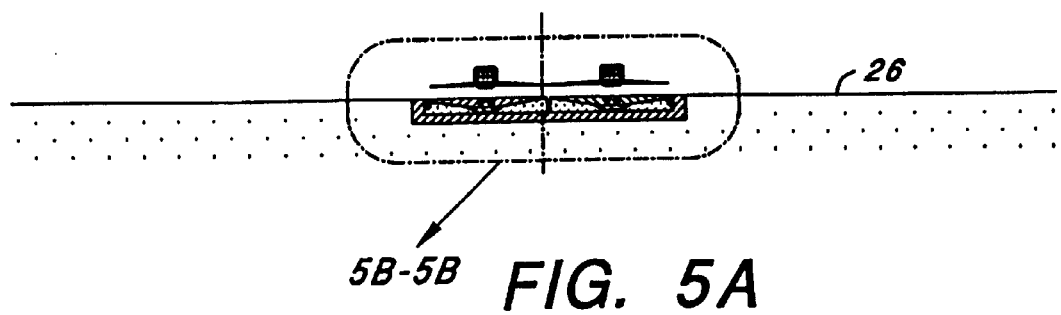
FIGS. 5A and 5B respectively show a cross section, and an enlarged cross section, of a power coupling element and a power pickup element suitable for use in the roadway-powered EV system of FIG. 4.
Figure 5B:
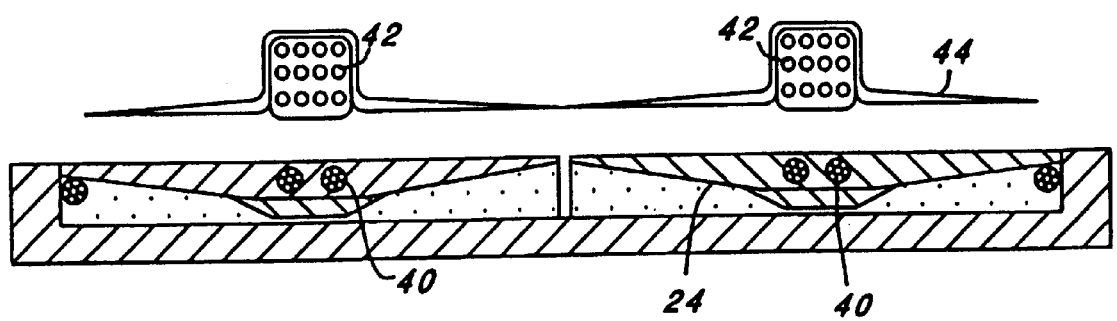
Figure 5C:
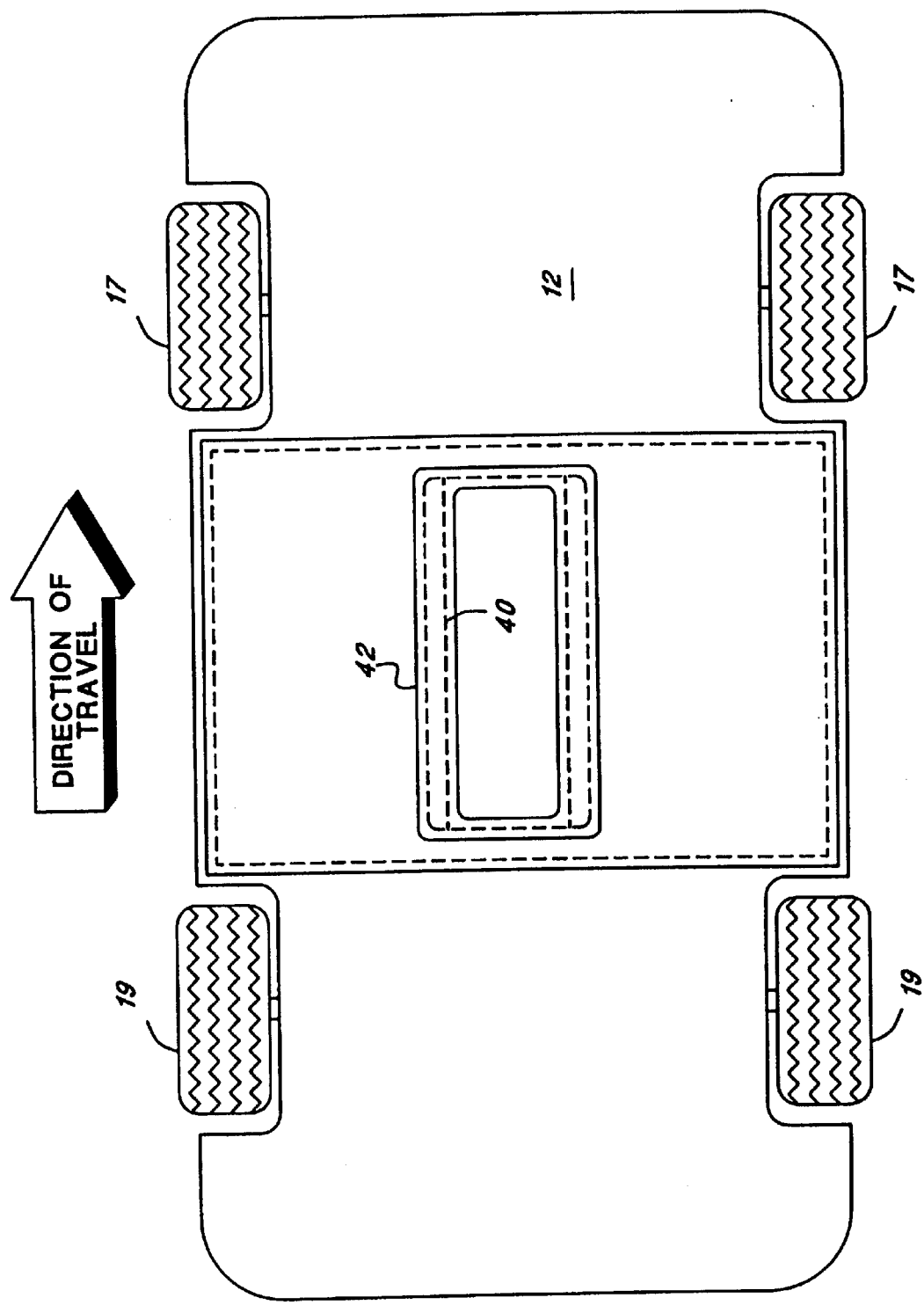
FIG. 5C shows a top view of the power coupling element and the power pickup element of FIGS. 5A and 5B, as used in the RPEV of FIG. 1, when they are aligned for power transfer.

A cross-sectional view of the roadway power transmitting module 24 is illustrated in FIGS. 5A and 5B, with FIG. 5B showing an enlarged view of the section of the roadway that is circled in FIG. 5A. The preferred width of the coils 40 and 42 is about 65 cm, as seen in FIG. 5B, with the coil being centered in a typical lane of about 3.65 meters in width, as seen in FIG. 5A. As illustrated in FIG. 5C, both the embedded coil 40 and the onboard coil 42 may be characterized as "flat" or "pancake" coils that lie roughly in respective planes parallel to the surface of the road 26. The coils 40, 42 are elongated lengthwise (or longitudinally) with respect to the RPEV 12, so as to maximize coupling in cases where the RPEV 12 is in motion as the onboard coil 42 passes over the embedded coil 40.

With reference to the RPEV system of the present embodiment, it is noted that a conventional battery-driven electric vehicle is normally charged overnight for several hours in one's garage, and then the vehicle starts off the day with a full charge on the batteries. The rate of charge is inherently constrained by limitations of power available in the typical household, since 200 KW, if installed, would be prohibitively expensive. The rate of charge in the home is thus limited to 6 KW to 10 KW, which means that a typical recharge takes several hours.

The term "opportunity charging" has been used in the prior art to signify other times when a stopped vehicle can receive a charge, for example at curbside or in a parking garage, where it is stationary and can be plugged in.

Advantageously, with the RPEV system of the present embodiment, the idea of opportunity charging takes on a whole new meaning. In fact, since opportunity charging is so different for the RPEV system, a new term has been coined, "demand charging" or "demand responsive charging," to signify the difference. Demand responsive charging is, as previously explained, made possible by two technologies: (1) the non-contacting inductive coupling energy transfer system, and (2) an energy storage system that allows a very high rate of charge to take place. The combination of these two technologies and the associated onboard power control unit 32 make it possible to replenish the stored energy of an RPEV in minutes, not hours.

At least four types of demand responsive charging are possible with the RPEV system, described below.

A first type of demand responsive charging is charging of electric buses, using inductive coupling pads, at about 25 percent of its stops. Such charging transfers enough energy for the bus to run continuously for 24 hours a day, if necessary, since the energy storage system is being constantly replenished. This means that for a bus system less than 1 percent of the route would need to be electrified, contrasted with the trolley bus, which has 100 percent electrified roadway. From a cost standpoint, this means that a bus line can be electrified for less than 4 percent of the cost of overhead wires. It makes a practical electric bus possible for the first time.

For the bus, the energy transfer takes place for a 20 second to 30 second period when the vehicle is fully stopped, thus the air gap can be zero, or nearly zero, thereby greatly improving the efficiency as well as the rate of power collection. A representative electrification of a bus stop along a highway route is shown at area 86 in FIG. 4. Advantageously, using such demand responsive charging system for a bus line as described above makes possible an all-electric bus system that is competitive with a diesel bus in life cycle costs.

It should also be noted that in many cases, a bus has assigned layover points where it must wait for a few minutes in order to synchronize its route with an advertised schedule. In such instances, a charging pad 24 may be installed at the layover point, and the RPEV bus could get enough energy replenishment in 3 to 5 minutes to run much of its assigned loop or route without the need for further energy transfer.

Figure 6A:
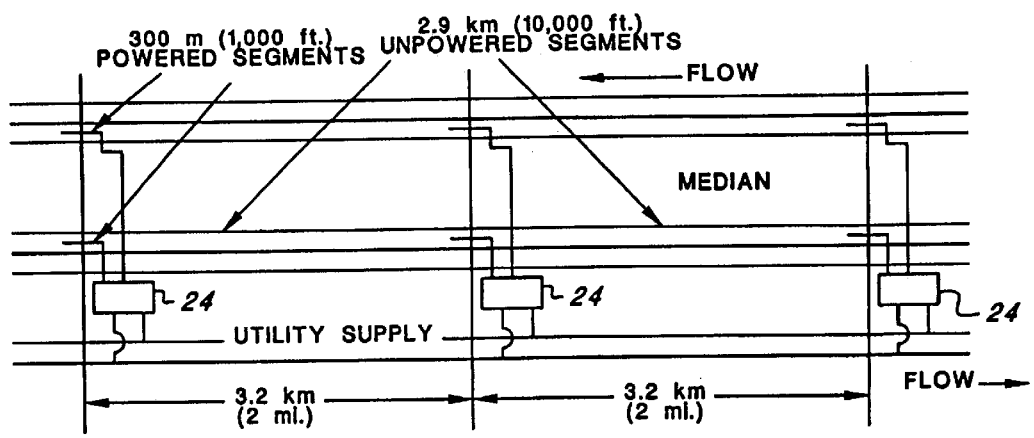
FIG. 6A depicts one manner in which only a portion of the roadways over which the RPEV of FIG. 1 travels need be energized with roadway power modules.

A second type of demand responsive charging for use with the RPEV system of the present embodiment is that of automobile and highway, and depicted in FIG. 6A. Heretofore, it has been assumed that an effective electrification system would require the heavily traveled freeway lanes to be fully electrified, i.e., at least one lane in each direction for even a thin network in a region. In the San Diego region, for example, this would mean about 500 lane-kilometers (312 lane miles) would need to be electrified if one established an electrification network on the freeways. However, with the RPEV system of the present embodiment, only about 10 percent of the powered lane actually needs power, with the remaining 90 percent being unpowered, as shown schematically in FIG. 6A. Hence, when the RPEV travels over the 10% of the lane that is electrified, it is charged, which charge provides sufficient energy for it to travel the remaining 90% to the next electrified location. In practice, of course, a large safety factor is designed into the RPEV so that it has the capacity, when fully charged, to travel much further than the 90% distance to the next charging location. However, the point is that the RPEV receives a charge as it is traveling over electrified portions of the roadway. From a system specification standpoint, minimum power transfer rates of 100 to 140 kW in motion, or roughly 30 to 50 KW/m, are desirable. The onboard energy storage system 30, when realized using a network of EMB's, advantageously permits this rate of power collection to take place.

Figure 6B:
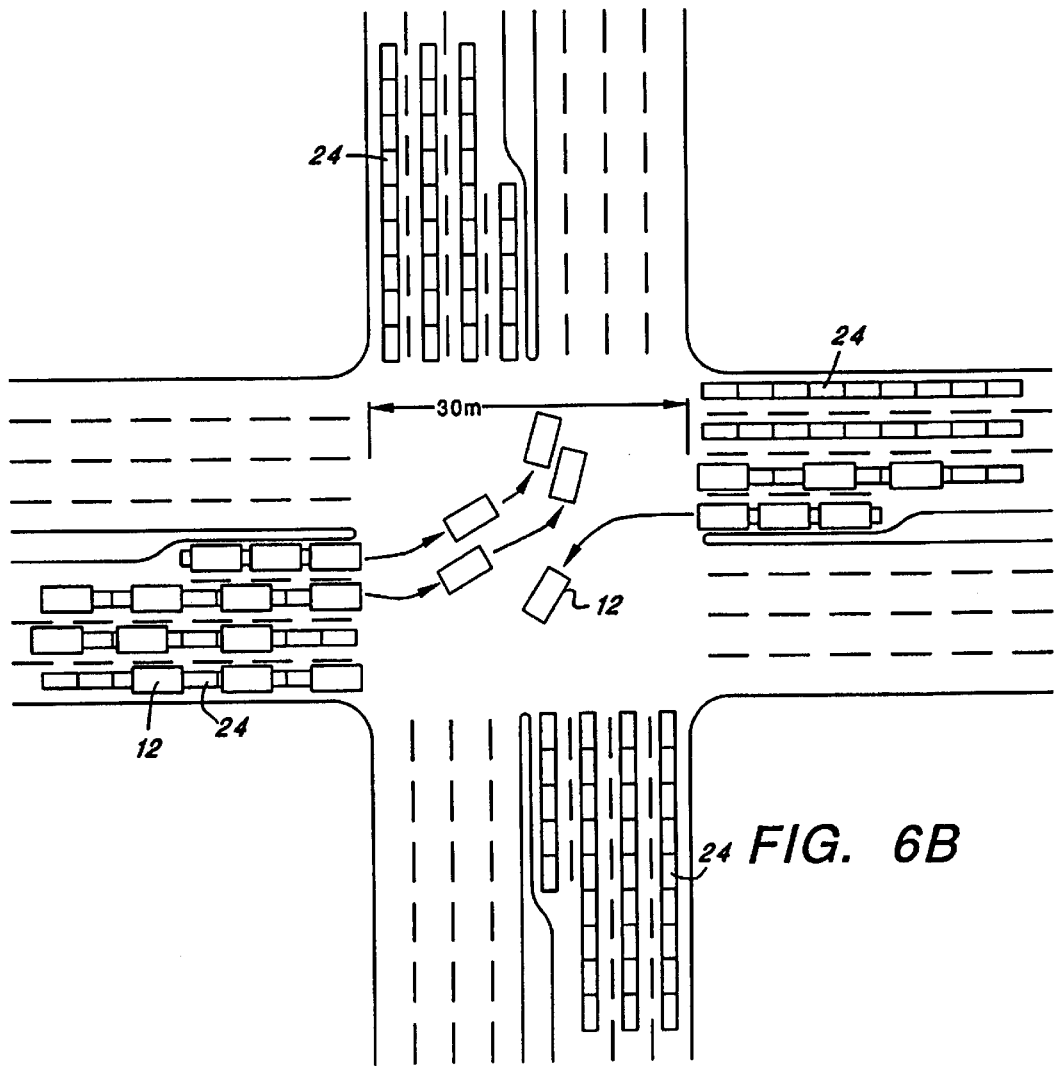
FIG. 6B depicts the electrification of the roadway over which the RPEV of FIG. 1 travels at a multi-lane, signalled intersection, where vehicles must often come to a complete stop as they wait their turn to go through the intersection.
Figure 6C:
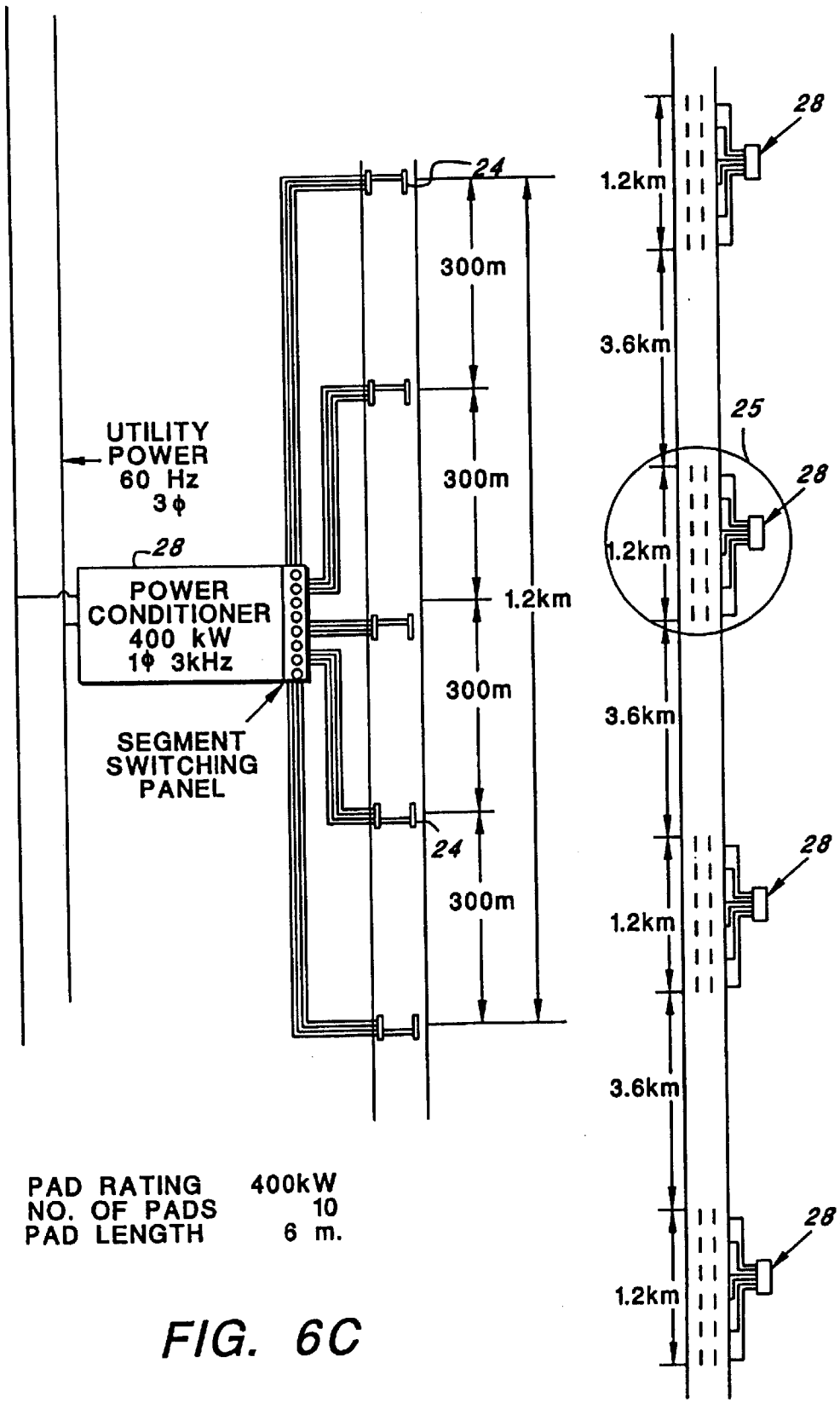
FIG. 6C illustrates electrification of the roadway over which the RPEV of FIG. 1 travels, with clusters of power coupling elements being distributed over the length of the roadway.

A variation of the demand responsive charging system shown in FIG. 6A is depicted in FIG. 6C. In FIG. 6C, the roadway power transmitting modules 24 (charging pads) are spaced about every 300 m over a distance of, e.g., 1.2 km, and are thus grouped in clusters 25 of five modules 24 each, with each cluster 25 being powered from the same power conditioner 28. The clusters 25 are then selectively spaced along the length of the roadway, e.g., with a non-electrified section of roadway of about 3.6 km separating the clustered sections. Thus, for the cluster configuration shown in FIG. 6C, a new cluster of power transmitting modules 24 is found about every 4.8 km of the roadway.

A third type of demand responsive charging for use with the RPEV system is that of selective electrification of a signalized arterial intersection, as shown in FIG. 6B. In FIG. 6B, which shows an aerial view of a typical intersection, the electrified portions of the intersections, i.e., those that have the roadway power transmitting modules 24 embedded therein, are shaded. All RPEV's 12 passing through the signalized arterial intersection are able to take advantage of demand responsive charging. The typical transit time through the intersection is about 45 seconds to 60 seconds. During this time, the RPEV receives as much energy from the roadway module 24 as it could in a mile of a powered lane on the highway. Thus by electrifying the last 30 meters of a signalized intersection lane, or lanes, 2% of the arterial lane being electrified has the same effect as fully electrifying the lane.

Figure 7A:
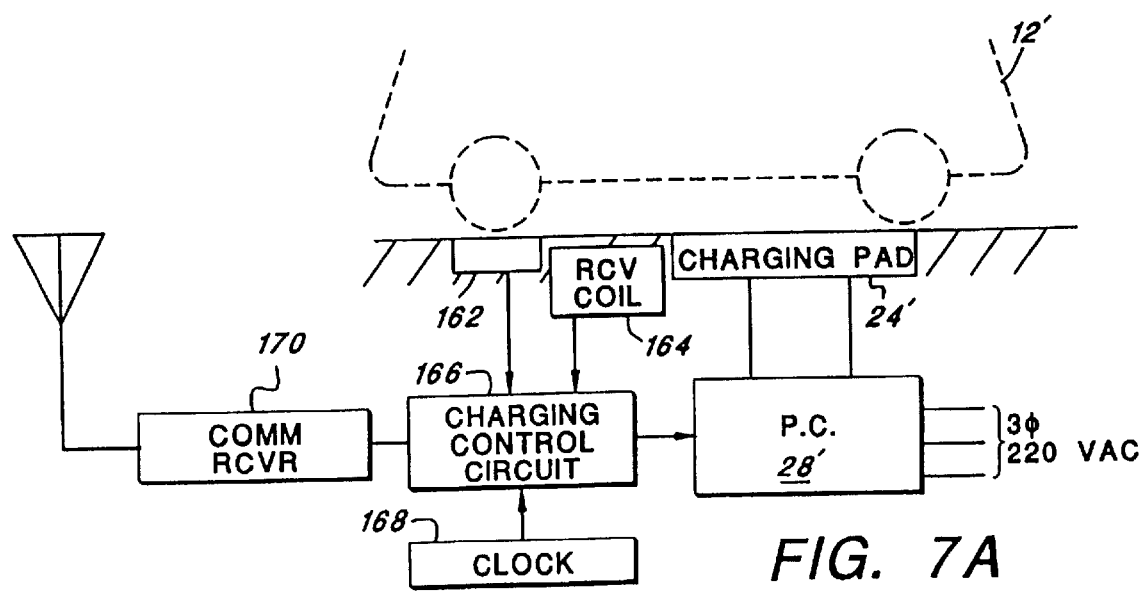
FIGS. 7A, 7C show one manner in which electronic garaging or overnight charging may be realized within the RPEV system of FIG. 4.
Figure 7B:
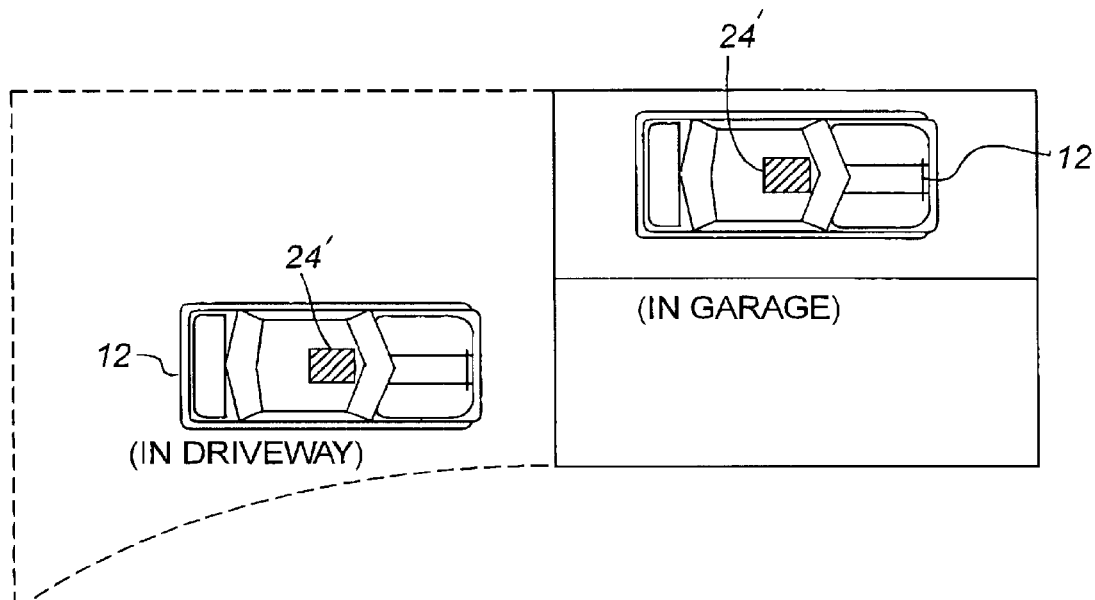
FIG. 7B is a block diagram that functionally depicts electronic garaging features of the embodiment of FIGS. 7A and 7C.
Figure 7C:
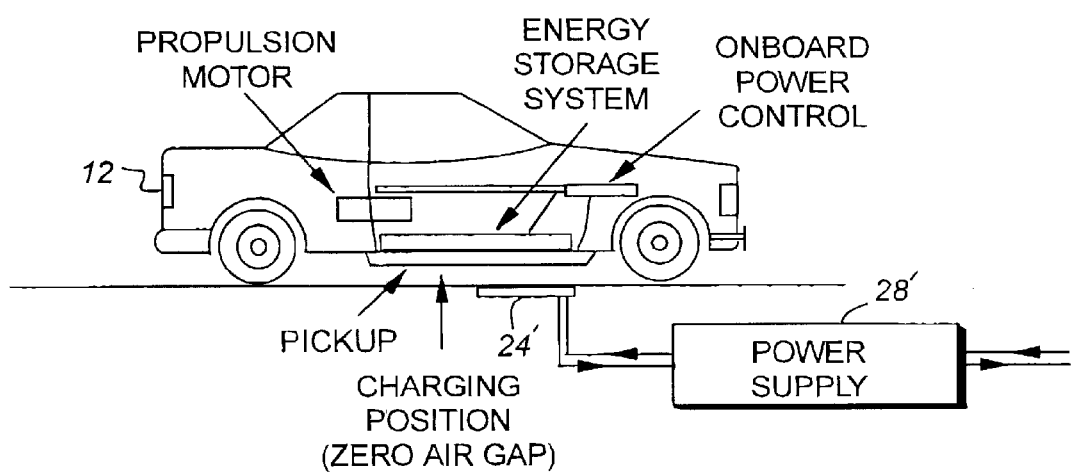

A fourth type of demand responsive charging that may be used with the RPEV system is that of electric garaging. In electric garaging, a charging pad 24', approximately 1 meter square and 3 cm thick, is installed on the surface of a driveway or garage floor, as shown in FIG. 7. The pad 24', and associated power conditioner (power supply) 28', are capable of operating in two modes. In a first electric garaging mode, low levels of continuous energy flow, e.g., 200 watts to 500 watts, are provided. Such energy flow is used to provide a stable interior temperature in the RPEV 12 from about 50° F. to 70° F. corresponding to cold or hot climates. The RPEV commands the rate of energy flow according to its need to regulate interior temperatures, and is thermostatically controlled.

The energy transfer system for the electronic garaging first mode is preferably actuated remotely a few minutes in advance of use to bring interior temperatures to a comfortable level, and a data link between the roadway and vehicle will provide security against tampering or theft. The mechanical gap between the vehicle pickup coil 42 and the roadway element 24' is adjusted to essentially zero in this mode of operation, as well as in the static charging mode described next.

In a second electronic garaging mode, the pad 24' is used for an overnight recharging of the energy storage system 30 of the RPEV 12. In this case the power flow levels are between 6 KW and 10 KW (comparable to an electric clothes dryer in a residence), and the time for recharge ranges from 1 hour to 2 hours.

Preferably, the electronic garaging operates in a demand responsive mode, and is fully automated and hands-off for the driver. The RPEV generates an enabling signal to carry out the charging at times of day when utility rates are lowest, e.g., at 2:00 a.m., turning it off when the energy storage is replenished.

The circuitry needed to accomplish the two modes of automatic garaging described above is further depicted in FIG. 7A. A pressure sensor 162 senses the presence of a vehicle 12' parked above the charging pad 24'. A receive coil 164 (which may function as the sensor 50 (FIG. 2) may further be used to verify the identity of the vehicle 12'. A charging control circuit 166 controls when the power conditioner 28' is allowed to charge the charging pad 24' and at what charging level. To this end, a clock circuit 168 provides an indication to the control circuit 166 of the time of day so that the high level charging mode can occur when the electric rates are the lowest. In like manner, a communications receiver 170 is attached to the control circuit 166 so that the low level charging mode (used, e.g., to bring the interior of the vehicle 12' to a comfortable temperature) may be invoked on command. The owner of the garaged vehicle, for example, may invoke the low level charging mode using a remote transmitter, similar to a garage door opener transmitter; or by throwing a remote switch that is electrically coupled to the receiver 170.

The RPEV, as previously described, may issue an enabling signal through the above-mentioned radio frequency communications channel to command the energy transfer to take place, depending on the energy storage requirements at that moment. A high rate of energy transfer for a short period is preferred, if possible. But regardless of whether the transfer is for a short period of time, as at an intersection or bus stop, or for a longer period of time, as at a parking stall or garage, the system is charged only as needed and as requested or demanded, hence the term "demand responsive charging" properly describes the charging action that takes place.

Figure 8:
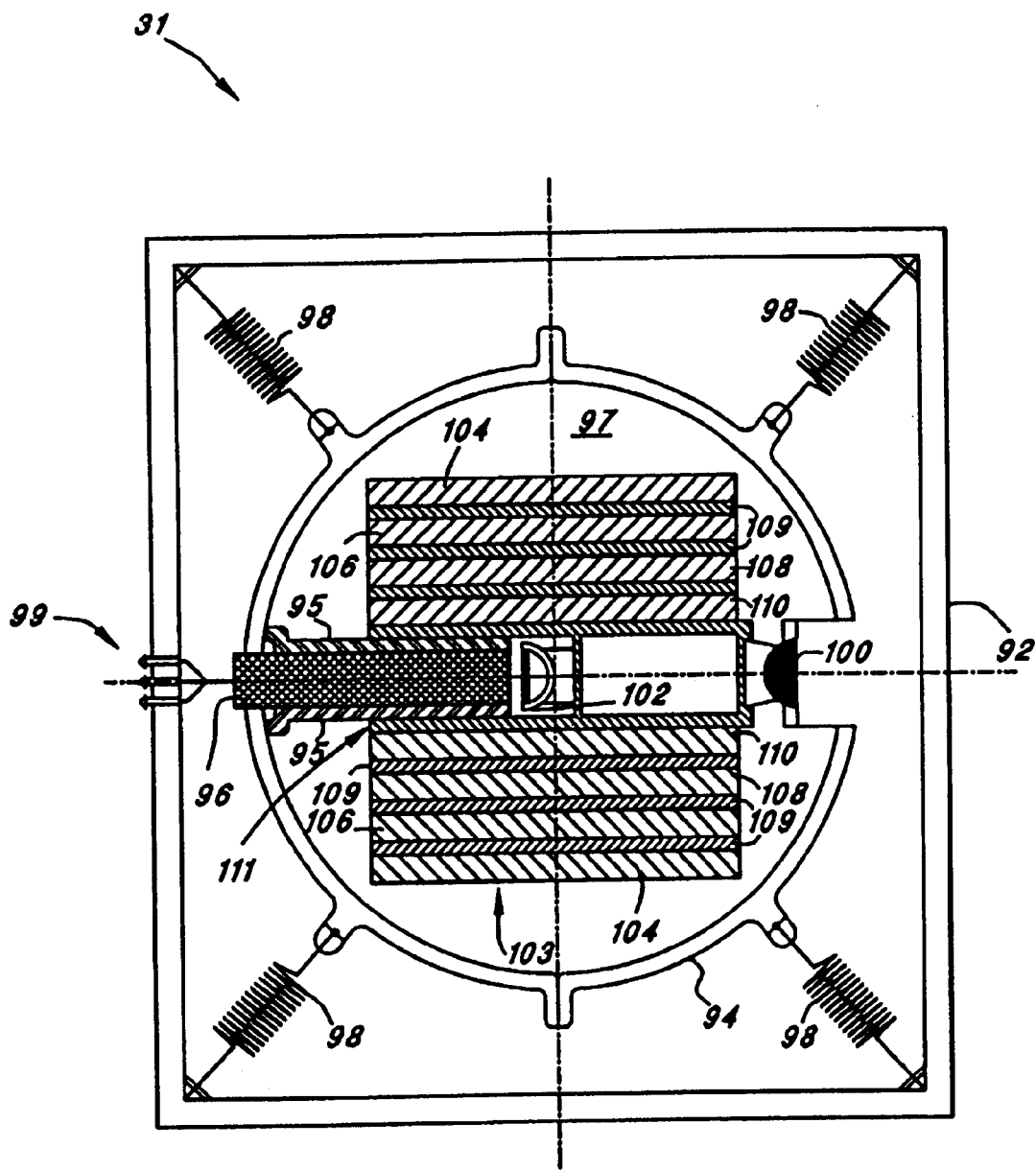
FIG. 8 depicts a schematic cutaway view of a modular EMB of a type that may be used with the embodiment of FIG. 1.

Referring next to FIG. 8, a schematic cutaway view of a modular EMB 31 of a type that may be used with the present embodiment is illustrated. An EMB module 31 of the type shown in FIG. 8 is described more thoroughly in Post et al., "A High-Efficiency Electromechanical Battery,", Proceedings of the IEEE, Vol. 81, No. 3, pp. 462–474 (March 1993). Basically, the EMB module 31 includes a rotor 103 mounted for rotation on magnetic bearings 100 and 102 within a sealed vacuum chamber 97. The sealed vacuum chamber 97 is defined by thin stainless steel walls 94, reinforced with fiber composite, and a glass ceramic sleeve 95. The entire vacuum chamber 97 is then mounted inside of a containment vessel 92 made of highly impact-resistant material, such as three-dimensional fiber composite. Appropriate gimbal mounts 98 (represented as springs) are used to mount the vacuum chamber 97 within the vessel 92. Three-phase, stationary, generator windings 96 are mounted outside of the vacuum chamber 97, between the thin walls 95 that define a narrow neck portion of the vacuum chamber. Each winding terminates at one of three terminals 99.

The rotor 103 is made from concentric rotating cylinders 104, 106, 108 and 110. The concentric rotating cylinders are made from thin walls (10% of the radius) to prevent delamination, and are separated by an elastic material 109. A magnet array 111 is placed on the inside of the inner concentric rotor cylinder 110 to create a rotating dipole magnetic field. The rotor 103 rotates at a velocity of the order to 10,000 rads/s (i.e., about 3,000 rot/s), and allows each EMB module to produce about 1 kW-h of energy.

Advantageously, the EMB module 31 stores more energy per unit mass or per unit volume than other known energy devices. This is because stored energy increases only linearly with the mass of the rotor (for a given geometry), but goes up as the square of its rotation speed. Since the rotor 103 is made of a light, strong material, it can be spun much faster than a heavy strong material (commonly used in conventional mechanical flywheels) before centrifugal forces threaten to break it up. The result is that the EMB can store much more energy, and more safely, than has previously been possible.

Composite materials based on graphite make it possible to build the EMB with a specific energy of about 150 Wh/kg, and a specific power that is orders of magnitude greater than anything achievable by an electrochemical battery or even an internal combustion engine. As indicated previously, the EMB can deliver a specific power of 5,000 to 10,000 W/kg.

To keep the EMB from running down, the rotor 103, as indicated, runs on magnetic bearings 100 and 102 in the vacuum chamber 97, realized, e.g., using permanent magnets made from Nd-Fe-B. Such bearings offer the added advantage of extending the EMB's life since there is no mechanical contact, and hence no wear, with this mode of suspension. As a result, the sealed EMB, has an extremely long lifetime, and should outlast the vehicle in which it is carried.

The vacuum chamber 97 is evacuated to a pressure of $10^{-3}$ to $10^{-4}$ pascals. To achieve and maintain a vacuum of that pressure, it is important that the rotor materials minimize vacuum outgassing, and that other materials employ modern getter alloys.

In order to assure safety, which is always a concern any time a great deal of energy is stored in a small volume, the rotor materials are selected and designed to fail by disintegrating into a mass of fairly benign fluff or "cotton candy". In contrast, massive steel rotors, such as are used in mechanical flywheels, may fail in a spectacular fashion, throwing off large chunks of shrapnel. The vessel 92, also made of a three-dimensional composite, is able to readily contain any such disintegrating mass by incorporating into its design high-strength fibers that run in all three directions. With such construction, any cracks that get started in the housing are not able to propagate.

Advantageously, the EMB is ironless. This feature not only keeps the weight low, but prevents hysteresis losses common in iron systems. Moreover, since inductances of the multi-phase windings are extremely low (with no iron present), and since rotation speeds are high, unusually high peak power outputs are achievable, with stator copper losses that can readily be handled by conventional means (air or liquid cooling).

Figure 9A:
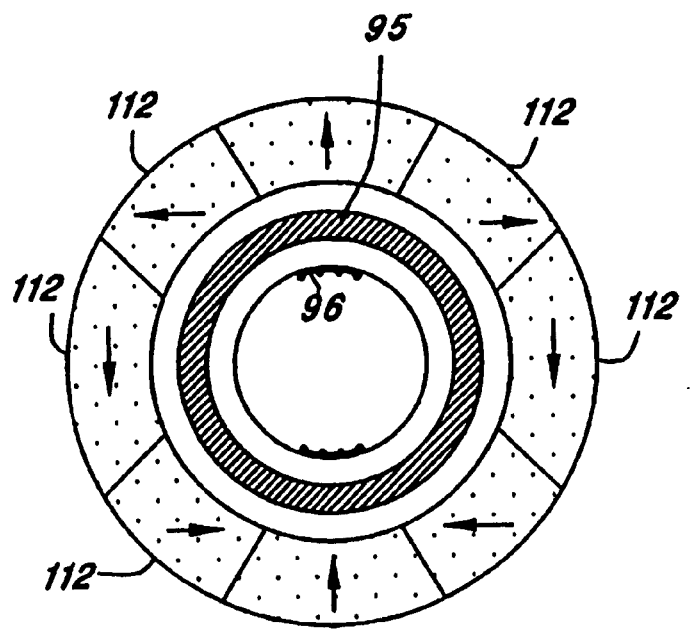
FIG. 9A illustrates an end view of a Halbach array of a type that may be used with the EMB module of FIG. 8.
Figure 9B:
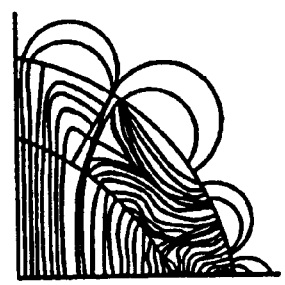
FIG. 9B depicts the calculated field lines for a quadrant of the Halbach array of FIG. 9A.

A central feature of the EMB is the generator/motor design. A special array of permanent magnet bars 112 is mounted on the rotor at 109 (FIG. 8). An end view of such array, known as the Halbach array, is shown in FIG. 9A, with the arrows indicating the relative polarity of the bar magnets 112. The magnetic lines of force associated with one quadrant of such array are shown in FIG. 9B. Of significance is the uniformity of the interior field, and its near cancellation outside of the array. Using Nd-Fe-B magnets, having a $B_r$ equal to 1.25 Tesla, dipole fields of the order 0.5 T can be readily obtained.

A typical EMB module of the type shown in FIGS. 8, 9A and 9B, provides the following operating parameters:

| Rotation speed: | 200,000 rpm |
| --- | --- |
| Magnetic field of Halbach Array: | 0.5 T |
| Length & Width of windings: | 0.8 m × .04 m |
| Number of turns: | 10 |
| Output voltage (3-phase): | 240 V rms |

It is to be emphasized that the EMB is the preferred energy storage device for use with the RPEV of the present embodiment because the EMB offers specific power and specific energy that makes it a viable energy source for an electric vehicle. As other alternative energy sources or energy storage devices are developed, offering the same or similar performance relative to their specific power and specific energy, such alternative energy sources may also be used with the present embodiment.

Figure 10:
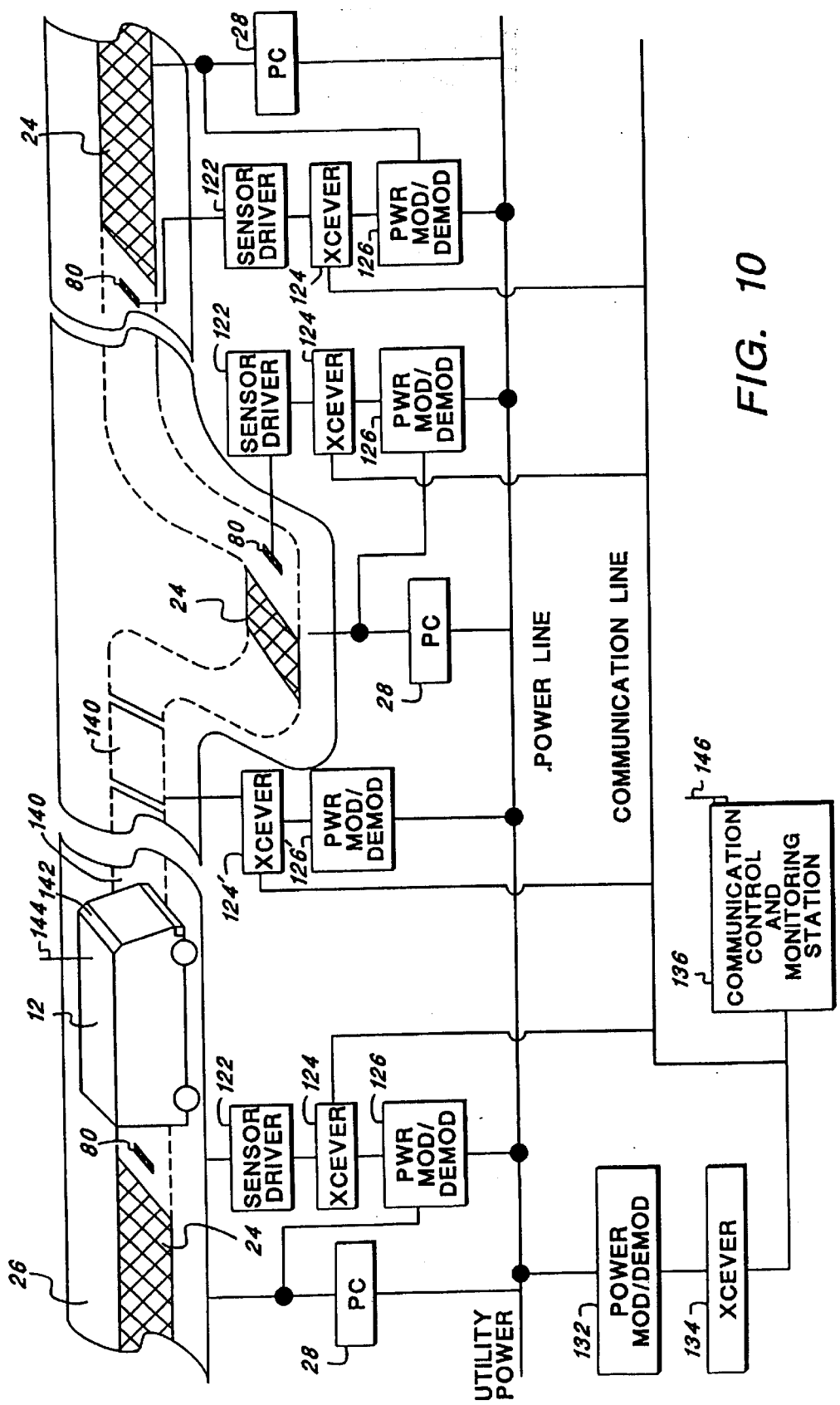
FIG. 10 schematically illustrates various types of communications channels that may be used with the RPEV system of FIG. 4.

Referring next to FIG. 10, the communications channel provided as part of the RPEV system will be described. It is noted that several different types of communications channels are illustrated in FIG. 10, any one, or any combination of which, may be used with the present embodiment. Hence, not all of the elements shown in FIG. 10 are needed for a given type of communications channel, but all such elements are nonetheless shown in FIG. 10 in order to reduce the number of figures that might otherwise be needed.

A first type of communications channel useable with the present embodiment is used to broadcast roadway conditions to the RPEV before the RPEV encounters such conditions. Such an early roadway-condition warning system includes a plurality of roadway sensors 80 that are selectively positioned along the roadway 26, e.g., at the same locations where the charging pads 24 (also referred to as the roadway power transmission modules) are located. Typically, such roadway sensors will be located at least 300 m apart, and may be much farther apart, e.g., 1 to 5 km. The roadway sensors 80 detect the condition of the surface of the roadway 26, and other environmental parameters of interest. Typically, the sensors 80 sense at least whether there is any moisture or ice on the roadway surface, and may also sense the temperature of the roadway surface.

Each roadway sensor 80 is connected to an appropriate sensor driver circuit 122 that provides the sensor with whatever electrical signals it needs to perform its sensing function. For a moisture/temperature detector, such signals typically include just a current pulse of a few ma. The sensor driver circuit 122, after determining the measured parameter, encodes this information to create a sensor signal, or sensor word. The sensor word, in addition to the measurement of the moisture/temperature, also includes an identification number to identify the particular sensor 80 from which the sensor signal originated. Alternatively, the sensor signal may be transmitted in a time-division multiplex scheme that uniquely identifies the sensor from which it originated. The sensor word is provided to a transceiver (xcvr) circuit 122. The roadway sensor 80 and corresponding sensor drive circuit 122 are of conventional design.

The transceiver circuit 124, for this application, functions as a transmitter and provides the sensor word to a power modulator/demodulator circuit 126. The power modulator/demodulator circuit 126 is coupled to the main power line 130 that provides the primary power to the power conditioners 28 and to the output of the power conditioner (PC) 28 that provides the 1-phase, 3000 Hz (nominal), signal to the charging pad 24. The information signal is superimposed with the power signal on the power line, or is otherwise merged with the power signal, so that the power line conductor passes both the information signal and the power signal. The manner of superimposing an information signal on a power signal, or modulating a power signal with an information signal, is known in the art. (See e.g., the security system art, where the ac power lines of a protected structure are also used to interconnect individual sensors with a central monitoring device.) The main power line 130 thus functions as the medium, or communications channel, through which sensor signals may be transmitted from one power modulator/demodulator 126 to another. Each power modulator/demodulator 126 further couples the signals stripped off of the main power line to the respective charging pads so that such signals may be coupled into each RPEV as it travels over the respective pad 24. Moreover, as seen in FIG. 10, an additional power modulator/demodulator circuit 132, and a corresponding transceiver circuit 134, couple the sensor signals, and any other signals that may be on the communications channel (the main power line 130) to a communications control and monitoring station 136 (or communications center). The communications center 136 thus functions as a communications center for the RPEV system.

The RPEV 12, upon being charged with a power signal through the charging pad, also receives the sensor signals from the various sensors along the roadway 26. Once received, the sensor signals are processed (using the onboard processor 56) and acted upon. Typically, the information contained within a sensor signal is at least displayed, e.g., "sensor No. xx, located at point yy on the roadway, reports ice and/or moisture," and may also be factored into any automatic controls that may come into play when that portion of the highway is reached.

An additional type of communications channel that may be used with the present embodiment is as described above, but further uses an existing or dedicated communications line 138 to tie the various transceiver circuits 124 together and to the communications control and monitoring station 136. Existing communications lines 138 that may be used as the line 138 include land-based telephone lines, cellular telephone channels, cable TV lines, and the like. Also, for many applications of the RPEV system, where a relatively small area is serviced by the RPEV's, a dedicated coax communications line, installed between each power transceiver unit 124, would be economically viable to serve the function of the communications line 138.

Still referring to FIG. 10, a further type of communications channel may be established by embedding into the roadway 26 a wire loop 140 that effectively serves as an antenna to couple signals to the RPEV 12 at all locations along the roadway where the charging pads 24 are not located, e.g., at all non-electrified roadway sections. (At electrified locations, signals may be coupled to the RPEV through the charging pads, as described above.) Such loops 140 may be coupled to the same input power lines that charge the respective charging pads. In those locations where there is not a charging pad, e.g., where the wire loop is some distance from a charging pad, a separate transceiver 124' may be connected directly to the wire loop 140. Such transceiver 124' is then coupled to a power modulator/demodulator circuit 126' (when used), or to the communications line 138.

In operation, the availability of the wire loop 140 allows continuous communications to be had with the RPEV regardless of where it may be located along the network of roadways and highways. Hence, telephone, video and other signals may be readily accessible within the RPEV as it travels along a route having the wire loop 140.

The wire loop 140 may be installed or embedded within the roadway 26 without great expense. In most instances, all that is required is to grind, cut, or etch a small groove or channel in the roadway surface, lay down a suitable conductor within the groove or surface, and cover or seal the groove or channel with tar, pavement, or other suitable filler.

As a further type of communications channel, the RPEV 12 may also carry onboard a conventional rf transceiver 142 (which may serve as the transceiver 59 in FIG. 2) that, through a suitable antenna 144, is in telecommunicative contact with the communications control and monitoring station 136, which also has an antenna 146. Such rf telecommunications channels are well known and used in the art, but potentially suffer from degraded reception and transmission in areas where there are mountains, buildings, or other structures or obstacles that interfere with the rf channel.

Other types of communications channels and transportation features that may be used with the RPEV system of the present embodiment are as described, e.g., in "Transportation", *IEEE Spectrum*, pp. 68–71 (January 1993), incorporated herein by reference.

Regardless of the type of communications channel that is employed, it is important to note that such communications channel, or channels, may be used to both send and receive information to and from the RPEV. Thus, for example, a particular RPEV may periodically send an identification signal that identifies that RPEV, and the location whereat the signal is received along the communications channel thus provides a way for the communications center 136 to "track" the RPEV. In addition, the RPEV may send the location signal that indicates the exact location of the RPEV, as described above, further refining "tracking" capabilities of the communications center 136. Such "tracking" capability is of significant benefit for fleet management purposes, and in particular for automated scheduling and dispatch of public transportation RPEV's, as described below in reference to FIG. 13. Further, with the ability to send signals to and receive signals from the RPEV, it is possible to completely control its operation from the communications center 136, thereby obviating the need to have a driver onboard the RPEV where the RPEV's are used, e.g., as a public transit type of system, or as a cargo delivery system.

Figure 11:
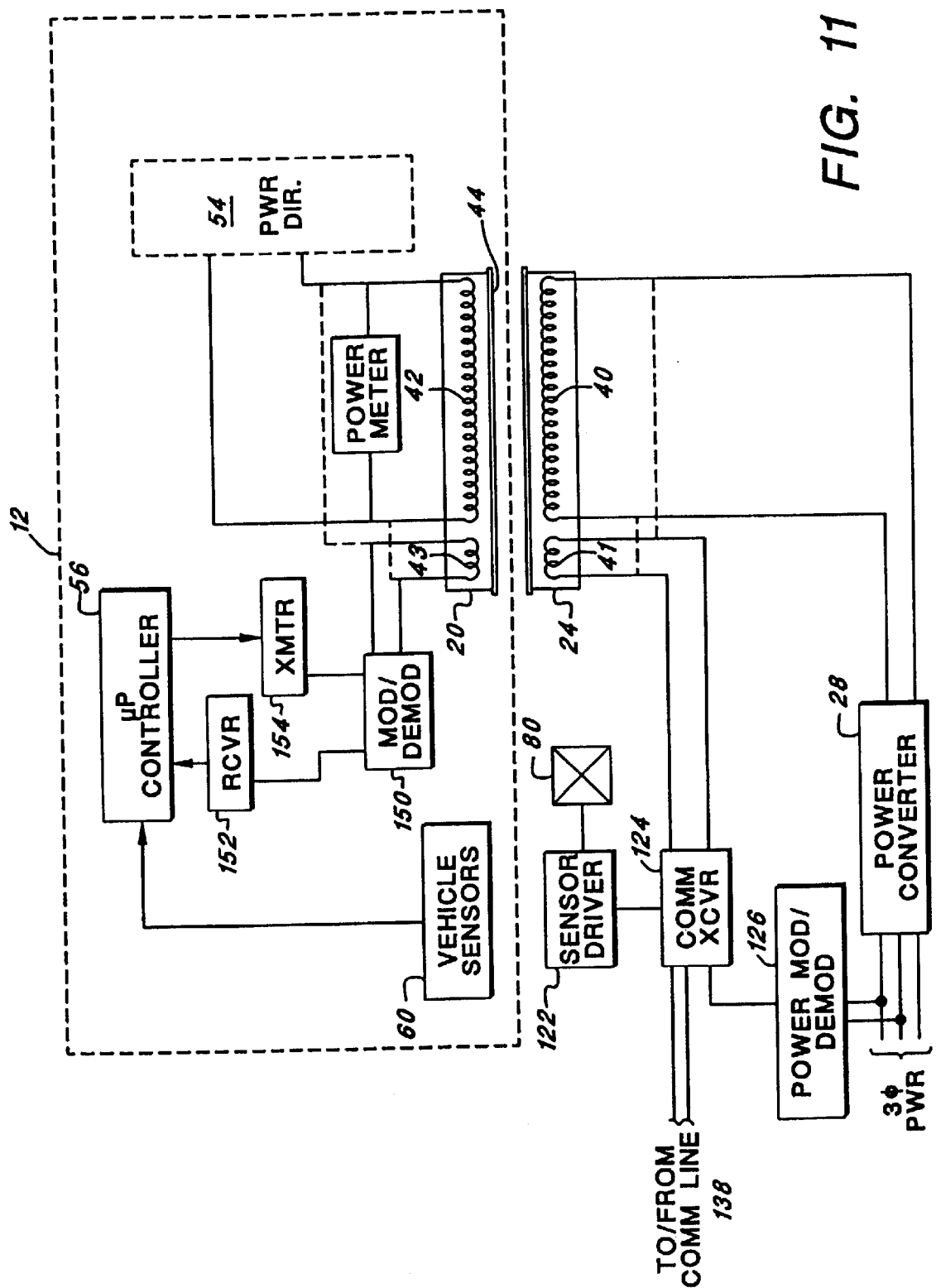
FIG. 11 shows a block diagram of communications channel elements of the embodiment of FIG. 1.

Referring to FIG. 11, a functional block diagram is shown of one manner in which the communications channel interface with the RPEV 12 may be realized. Many of the elements shown in FIG. 11 are the same as those of FIG. 2, although many of the elements of FIG. 2 have been omitted from FIG. 11 for clarity. In FIG. 11, the embedded coil 40 and the onboard coil 42 are shown, as has been previously described. The embedded coil 40 inductively couples the 1-phase power signal to the onboard coil 42. Such power signal may be modulated with the information signal that is to be transferred to the RPEV 12. Thus, when the power signal is received within the RPEV, the information signal is demodulated (stripped away from the power signal) using an onboard modulator/demodulator circuit 150, and then processed as needed (e.g., converted to an appropriate form) by a receiver circuit 152, and presented to the microprocessor controller 56. In some embodiments, by way of example, the information signal may include a command signal that is used to control the electronic actuators responsible for steering and braking. Thus, as described above, an information signal may be sent to the RPEV.

When an information signal is to be received from the RPEV, i.e., transmitted by the RPEV, such signal originates in the microprocessor controller 56 and is presented to an appropriate onboard transmitter circuit 154, which may be of conventional design, that converts the signal to an appropriate form for transmission. The signal is then presented to the onboard modulator/demodulator circuit 150, where it is modulated in an appropriate manner and presented to a transmit coil 43. The transmit coil 43 inductively couples the signal to a receive coil 41, which then presents the signal to communications receiver 124. The communications receiver 124 then couples the signal directly to the communications line 138, or to the power modulator/demodulator 126, which couples it to the main power line 130.

While a separate embedded coil 40 and receive coil 41 are shown in FIG. 11 to perform the sending and receiving functions, respectively, at the embedded location, and a corresponding separate transmit coil 43 and onboard coil 44 are shown that perform the sending and receiving functions onboard the RPEV, in practice the coils 40, 41 may be the same coil, as may the coils 43, 44.

Figure 12:
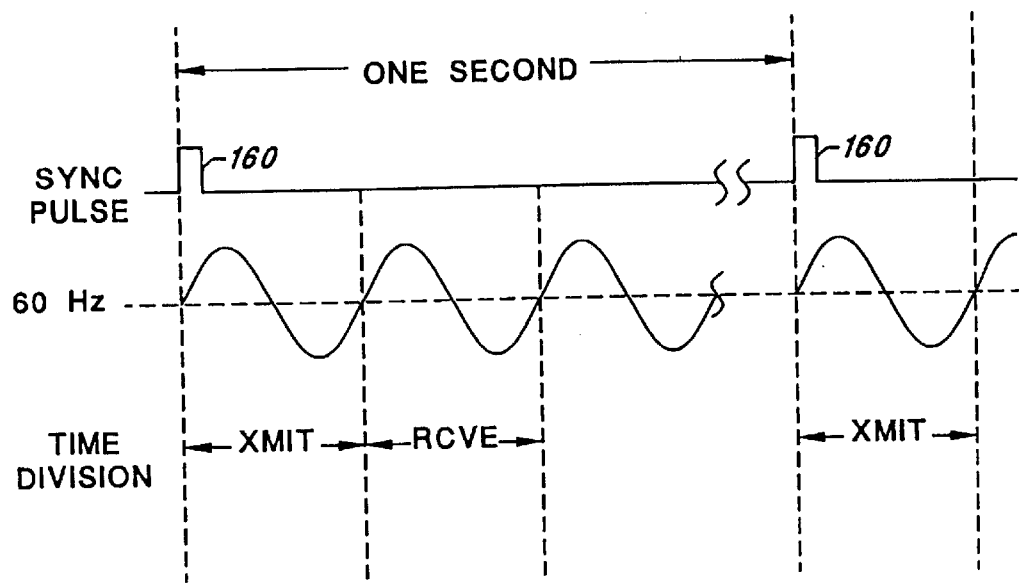
FIG. 12 depicts one type of time-division multiplex scheme that may be used by the communications channel elements of FIG. 11 to transfer data from a plurality of sensors.

FIG. 12 illustrates one manner in which the sensor signals, obtained from all the various roadway sensors 80 that may be located along the length of the roadway 26, and other signals transmitted to and from the RPEV over the communications channel, are multiplexed so that the signals are not confused and intermingled with each other. For example, with respect to the roadway sensor signals, it is important that a given RPEV be able to determine which sensor signal originated with which sensor (and hence from which roadway location the sensor signal originates). The multiplex scheme depicted in FIG. 12 is that of a time division multiplex scheme. In accordance with such scheme, all that is required to perform the multiplexing function is to assign a specific time when a certain identified signal is to be sent or received. Such time division is easily accomplished simply by counting cycles of the power signal. As seen in FIG. 12, a synchronization pulse 160 is generated by the utility company, or otherwise superimposed on the main power signal, every second. Hence, for a power signal that operates at a frequency of 60 Hz, there are exactly 60 cycles of the ac power signal between sync pulses, each cycle having a duration of 16.7 msec. Each of these cycles is assigned a certain function depending upon its location relative to the sync pulse 160. Thus, for example, the odd cycles following the sync pulse, i.e., the 1st, 3d, 5th, 7th, . . . cycles are assigned for transmission; and the even cycles following the sync pulse, i.e., the 2nd, 4th, 6th, 8th, . . . cycles are assigned for receiving. The first 12 cycles may be reserved for general communications functions in this manner. The remaining 48 cycles may be assigned to 48 respective sensors, with a first sensor (at a first known location on the roadway) inserting (superimposing) its sensor signal on the power signal during the 13th power cycle, a second sensor (at a second known location on the roadway) inserting its sensor signal on the power signal during the 14th power cycle, and so on. If there are more than 48 sensors to be monitored, then the multiplexing capacity may be increased by either increasing the duration between the sync pulses, e.g., to 2 sec., and/or counting half cycles of the power signal instead of full cycles.

Figure 13:
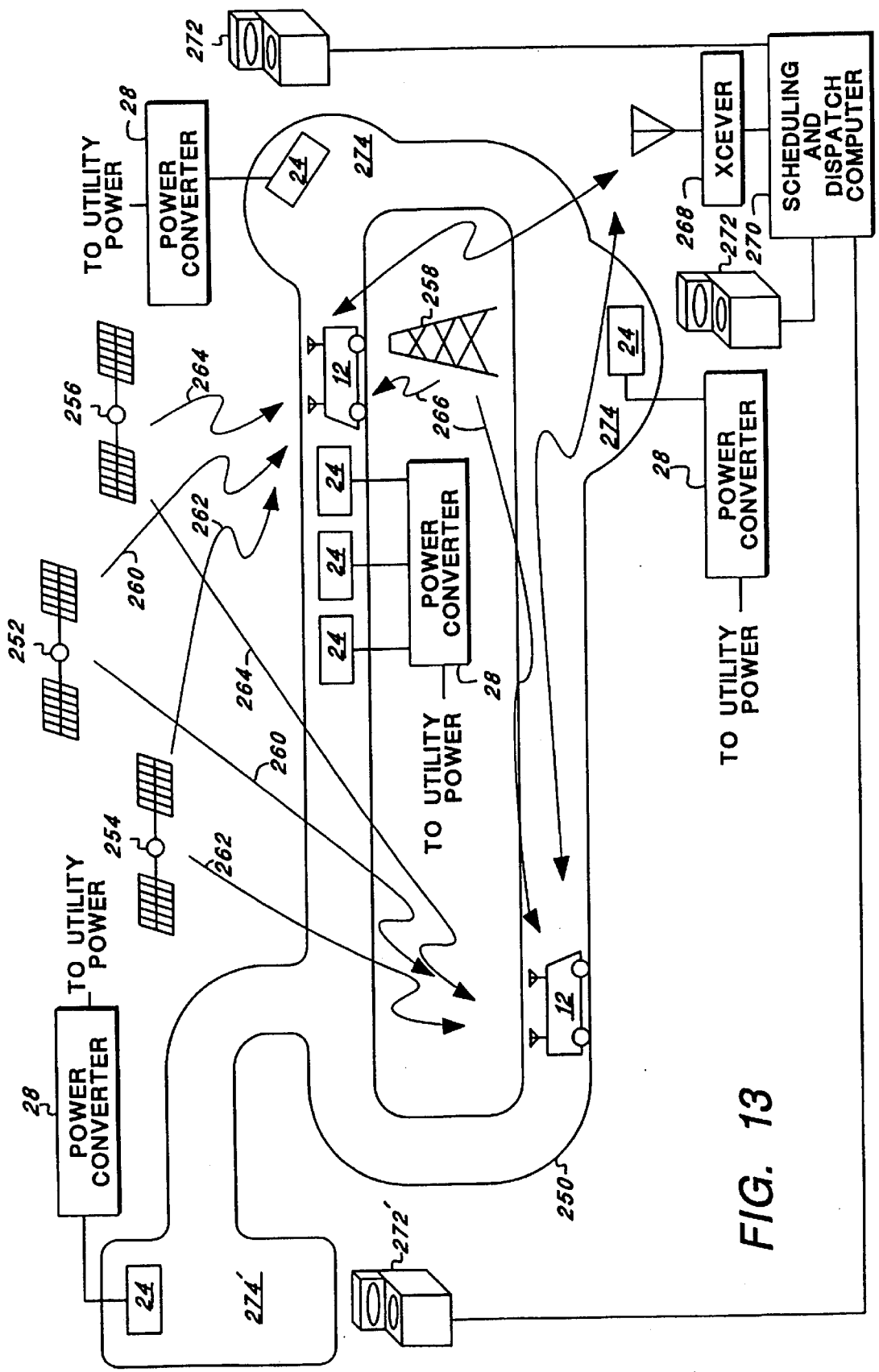
FIG. 13 illustrates a schematic diagram of a differential global positioning system used in combination with an automated guidance system and a scheduling/dispatch computer to automate the RPEV system of FIG. 4.

Referring to FIG. 13, a schematic diagram is shown of a differential global positioning system (dGPS) used in combination with an automated guidance system and a scheduling and dispatch computer to automate the RPEV system. The RPEV 12 (FIG. 1) is shown at two locations around a public transit route 250. Each of the RPEV's receives signals from each of at least three earth orbit satellites 252, 254, 256, and from a differential ground transmitter 258. Using known processing techniques, first, second and third position signals 260, 262, 264 received by the RPEV's from each of the satellites 252, 254, 256, respectively, are processed within the dGPS receiver 59 (FIG. 2) in order to determine the approximate location of the respective RPEV's. A differential position signal 266 is also processed by the dGPS receiver 59 using known techniques to precisely, i.e., within several centimeters, determine the location of the RPEV 12. As a protection against momentary loss of any of the position signals 260, 262, 264, 266, a dead reckoning system is also part of the dGPS receiver. The dead reckoning system operates in accordance with well known inertial positing technology, and therefore further explanation of the dead reckoning system is not made herein. In response to this precise determination of the RPEV's position (based on differential GPS in combination with inertial position determination), the location signal is generated by the dGPS receiver 59, and is passed to the microprocessor 56 (FIG. 2).

The location signal, in some embodiments, is used by the microprocessor 56 to determine a course error, which represents the difference in location of the RPEV as compared to a desired position. The desired position is time indexed and stored in the memory associated with the microprocessor, such that the microprocessor is able to determine a desired position of the RPEV based on the time of day. Once, the course error is determined, the microprocessor determines appropriate course and speed corrections and controls the electric drive 36 (FIG. 1) and/or the electronic actuators 38*a* (FIG. 1) to carry out such course and speed corrections. A human operator is also preferably on board to make course corrections in the event for some reason it becomes necessary to deviate from the desired position (such as might occur when pedestrians step in from of the RPEV).

In order to generate the time-indexed desired positions, the RPEV is manually driven over the route 250 while in a learn mode. In the learn mode, the location signal generated by the dGPS receiver is recorded in the memory, providing a record of a desired course and speed. In this way a desired course and speed for the RPEV can easily be established without the need for programming or other complex setup operations.

The location signal, in addition to possibly being used by the microprocessor to determine course and speed corrections can be transmitted by the transceiver 59 (FIG. 2) to a transceiver 268 coupled to a scheduling and dispatch computer 270. The scheduling and dispatch computer 270 is coupled to a plurality of "ATM-like" terminals 272, which display the locations and estimated arrival times of the RPEV's at various passenger loading/unloading areas 274 at which the "ATM-like" terminals 272 are installed.

One or more of the "ATM-like" terminals 272' may be installed at a passenger loading/unloading area 274' to which the RPEV's are not normally scheduled. When a passenger desires to be picked up at such a passenger loading/unloading area 274', they indicate this desire to the scheduling and dispatch computer 270 via the "ATM-like" terminal 272'. Upon receiving this indication, the scheduling and dispatch computer determines which of the RPEV's to send to pick up the passenger, and redirects such RPEV to the passenger. In this way, an RPEV can be summoned to the passenger loading/unloading area 274' not normally serviced, and the scheduling and dispatch computer 270 can dispatch an RPEV to respond to the summon. The dispatching of the RPEV is effected by the scheduling and dispatch computer 270 transmitting a rerouting signal to the RPEV to be dispatched to pick up the passenger.

In a slight variation of this feature, the "ATM-like" terminals 272 can be used to summon free-roaming taxi or limousine-like RPEV's. The taxi or limousine RPEV's do not operate on a route per se, but are operated on a point-to-point basis. While automated navigation is possible, just as with the public transit-type RPEV's described above, the passenger loading/unloading area 274' at which the passenger is picked up and the passenger loading/unloading area 274 at which the passenger is dropped off are determined by the passenger, as opposed to a prescribed route. In addition, the taxi or limousine-type RPEV, generally, will not make a stop to pick up other passengers until it has delivered its passenger to their destination passenger loading/unloading area 274.

In accordance with another feature of the present embodiment, when passenger load is unusually high, passengers can indicate that they were not accommodated by the last RPEV to stop at a particular passenger loading/unloading area by pressing one or more buttons on the "ATM-like" terminal (or via other input means, such as a touch screen). As the number of passengers not accommodated increases, the scheduling and dispatch computer 270 can alter the RPEVs' schedules and increase the number of RPEV's servicing the route 250. These schedule alterations are displayed on all of the "ATM-like" terminals so that passengers continue to know when they can expect the next RPEV at their particular passenger loading/unloading area.

As in the RPEV system of FIG. 4, as the RPEV's execute the route 250, either automatically or under the control of a driver, they may move over one or more embedded coils 24 embedded along the route 250, and/or one or more embedded coils 24 located in passenger loading/unloading areas. These embedded coils 24 provide power to the energy storage devices within the RPEV's as explained hereinabove. The embedded coils 24 are coupled to the power conditioners 28, which are coupled to utility power, as described above.

In this way, RPEV's are able to automatically guide themselves over a prescribed route, while having their energy storage devices recharged at various points along the route. In addition, the dispatch of RPEV's to not normally scheduled passenger loading/unloading areas, and automatic modification of the RPEVs' schedule is performed based on passenger load. Advantageously, modifications to the RPEVs' schedules are displayed using the "ATM-like" terminals, so that waiting passengers always know when they can expect the next RPEV at their passenger loading/unloading area.

Figure 14:
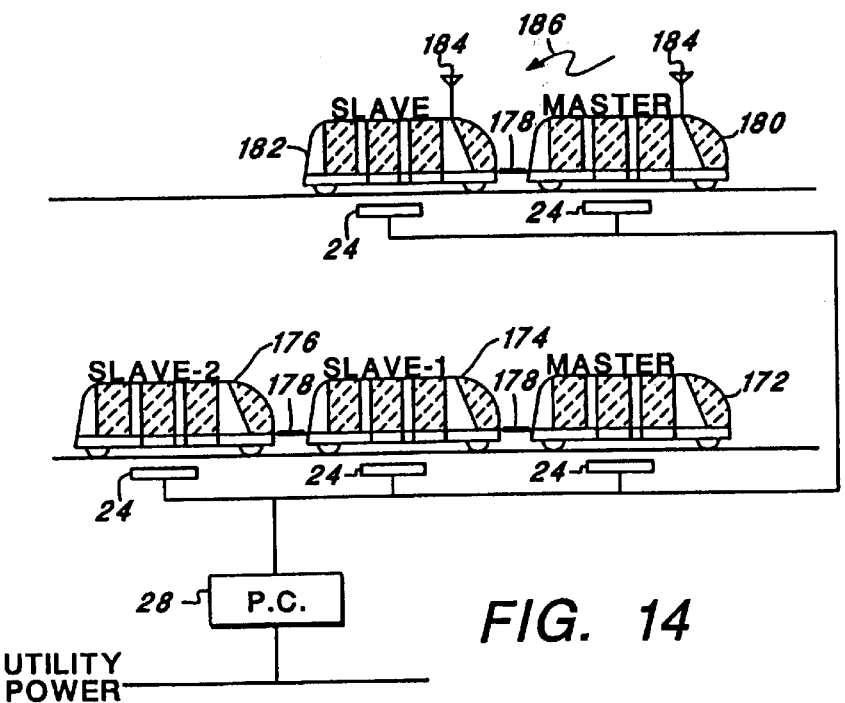
FIG. 14 illustrates how one or more follower ("slave") RPEV's may be electronically linked or coupled to a leader ("master") RPEV in order to form a "train" or "platoon" of RPEV's.

Referring next to FIG. 14, the concept of electronically linking a plurality of RPEV's together in order to form a "train" of such vehicles is illustrated. Advantageously, the RPEV may be totally controlled electronically, as a robot, because its controls are all amenable to simple commands, e.g., drive forward at a certain speed, steer left or right, brake, etc. Nonetheless, because the RPEV is constantly in traffic, and not all circumstances can be foreseen, it is usually desirable to have a real person onboard that can operate the vehicle, even though such person may, on occasion, place the vehicle in an "auto pilot" mode. Hence, by electronically linking more than one RPEV together, a lead RPEV, termed the "master", on which a live person operator is located, may generate the electronic signals that are used to control one or more following RPEV's, termed the "slave".

The master/slave RPEV system is depicted in FIG. 14. In the bottom portion of FIG. 14, a master RPEV 172 leads two slave RPEV's 174 and 176. The coupling of the electronic control signals from the master 172 to the slaves 174 and 176 is by way of a flexible, coiled cable 178 that simply plugs into both RPEV's. Such cable bears no mechanical tension as each RPEV has its own source of power, and is independently charged through the network of charging pads 24.

As shown in the top portion of FIG. 14, a master RPEV 180 leads a slave RPEV 182 with the electronic coupling being provided by a flexible, coiled cable 178, as previously described, and/or with an rf link, represented in the figure by the antennas 184 and wavy arrow 186. The rf link is used to provide an alternative or a redundant link (when used redundantly used to provide added safety) through which the proper command signals, may be received by the slave vehicle. As an alternative, or in addition to the rf link, an infrared communications channel may also be provided. When an infrared communications link is used, each of the RPEV's are fitted with an IR transmitter and each with an IR receiver. The IR transmitter on the "master" is used to communicate the command signals to the IR receiver on the "slave" and the IR transmitter on the "slave" is used to communicate feed back signals to the IR receiver or the "master".

The location signals generated by the dGPS receivers aboard the RPEV's are used as a backup to the cable, rf and/or ir links between the "master" and the "slaves" to assure than the "slaves" maintain proper positions relative to the "master." As the "slaves" deviate from proper positions behind the "master," course and speed corrections are automatically computed and executed by the "slaves."

Figure 15:
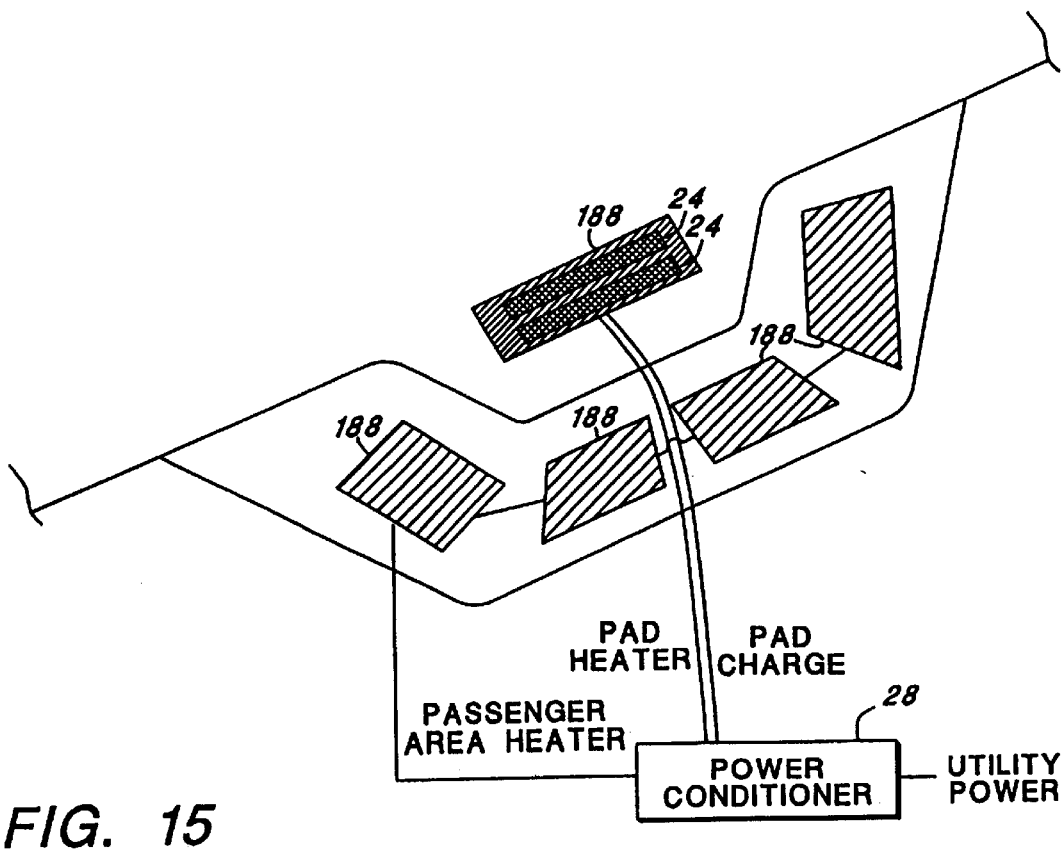
FIG. 15 schematically illustrates how a power converter used to electrify heating coils at a passenger loading/unloading zone and in the surface structure of the power coupling element in order to prevent the formation of ice or the accumulation of snow in a passenger area and/or above the power coupling element.

Turning next to FIG. 15, a further enhancement of the RPEV system of the present embodiment is schematically depicted. In FIG. 15, the charging pad 24 is located at a curbside designed for a passenger loading/unloading zone, and with the charging pad 24. The charging pad 24 is powered from a power conditioner 28 as previously described. Also powered by the power conditioner 28 are heating coil pads 188. The heating coil pads 188 are embedded in the sidewalk, or other surface material, that surrounds the passenger loading/unloading zone The purpose of the heating coil pads 188 is simply to melt any ice or snow that might otherwise accumulate at the loading/unloading zone, thereby providing a further convenience and measure of safety for the passengers, and any ice or snow that might otherwise accumulate on the charging pad 20, thus presenting the reduction of the air gap to zero. The heating coils 188 are not heavy consumers of electrical power, but operate using only about 200–400 W each. Thermostatic control of the heater coils may be used to maintain the surface temperature around the coils to within a desirable range.

Figure 16:
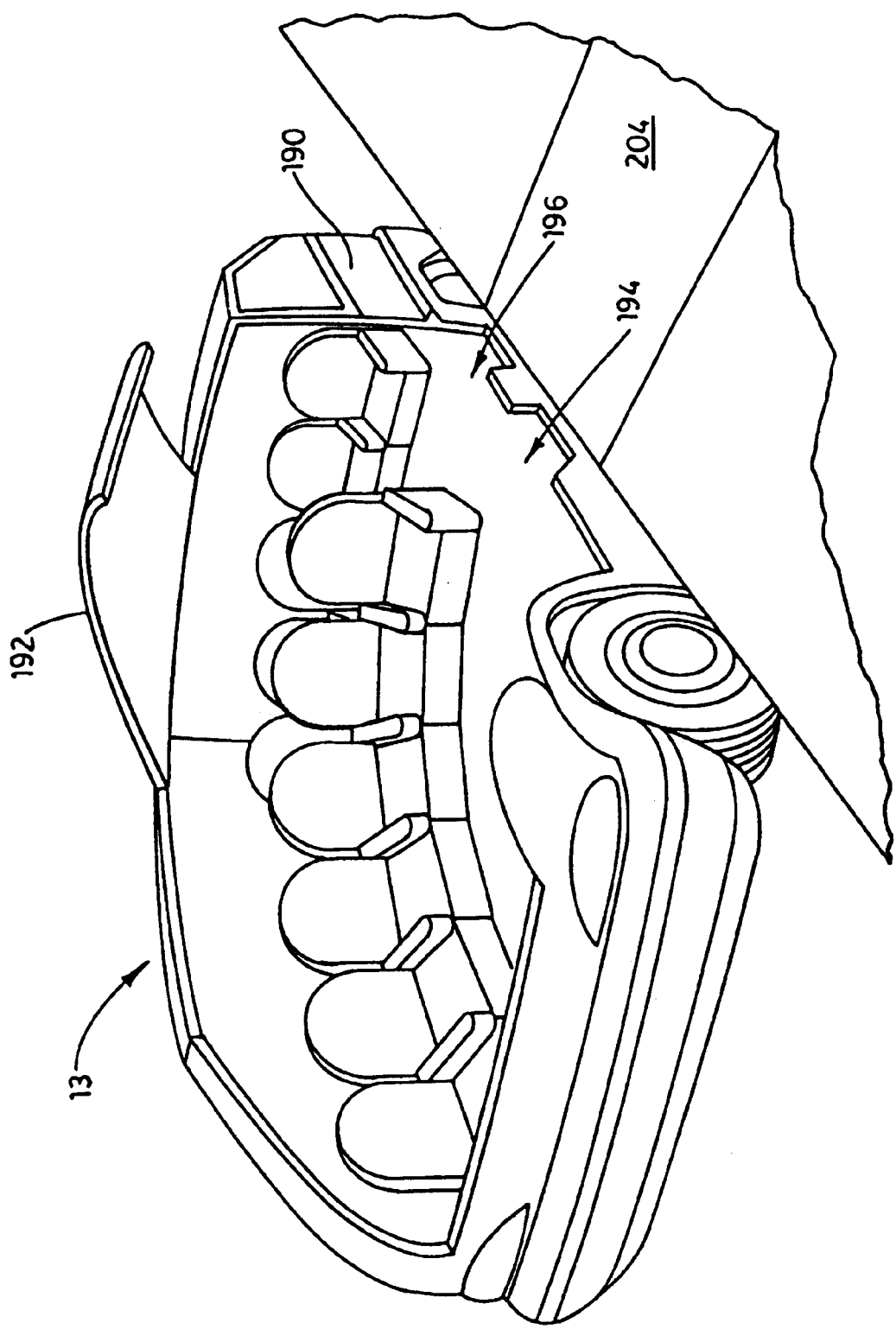
FIG. 16 is a cutaway view of the passenger compartment of one embodiment of an ergonomically-designed multiple occupancy vehicle (MOV) suitable for use as the RPEV of FIG. 1.
Figure 17:
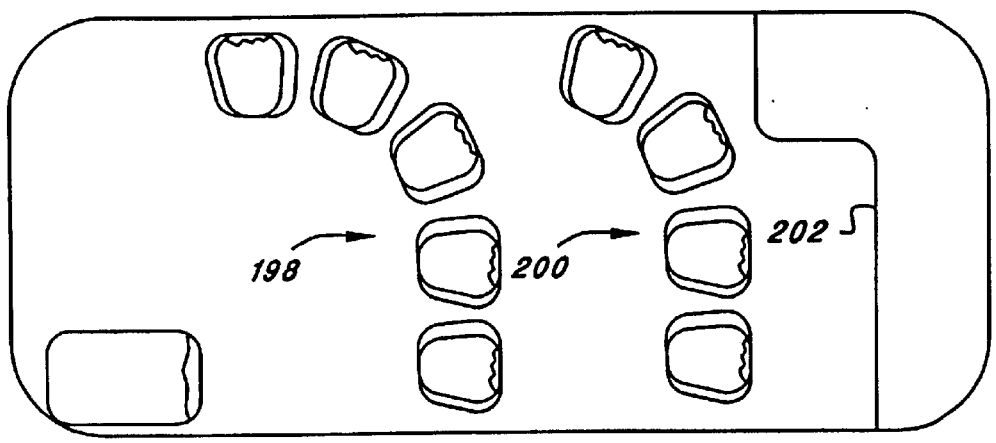
FIG. 17 shows a plan view of the one embodiment of the passenger compartment in the MOV of FIG. 16.
Figure 18:
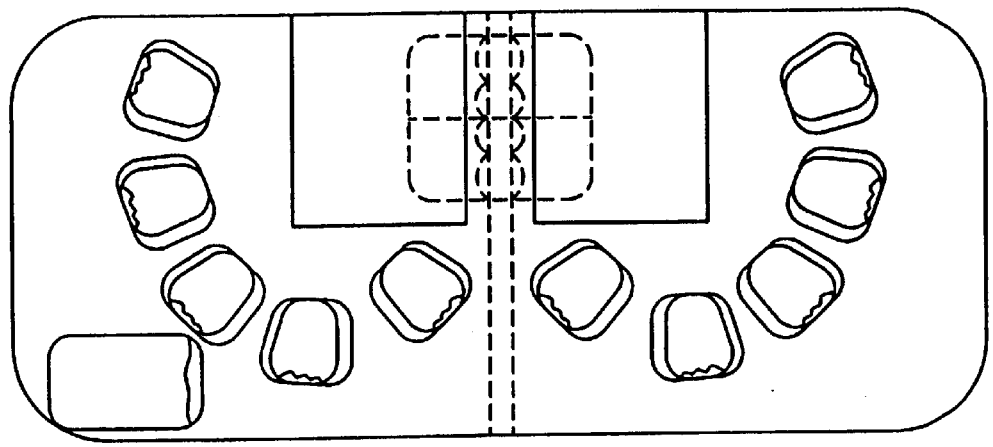
FIG. 18 shows a plan view of another embodiment of the passenger compartment in the MOV of FIG. 16.

A further important feature achievable with the RPEV system of the present embodiment is the ergonomic design of the passenger compartment of a multiple occupancy vehicle (MOV) that includes the RPEV features previously described. An MOV 13 is shown, partially cutaway, in FIG. 16. The MOV 13 is a unique, low-floor automobile-sized vehicle. That which is shown in FIG. 16 is for an all-seated version for 15–17 passengers, plus an operator. The plan view of one seating arrangement for such MOV is shown in FIG. 17 and a plan view of another seating arrangement is shown in FIG. 18. A standing version of the MOV may also be used. The MOV is adapted for traveling on the electrified roadway described herein. It is charged at stops using a demand responsive charging mode, also as previously described. It is an all electric vehicle, and utilizes electronic guidance at pullouts to assure good alignment between the coupling coils. It may be coupled electronically with other vehicles, as described in connection with FIG. 14 above.

The MOV 13 has a door system that allows easy ingress and egress with sufficient head room to avoid bumping one's head. For example, as seen in FIG. 16, the door system includes two components, a sliding door 190 and an upper door 192. When open, the sliding door exposes two entries 194 and 196, and the upper door 192 raises to provide increased head room. The entry 194 allows passengers access to a front curved row of six seats 198, seen best in the plan view of the MOV in FIG. 17 or in FIG. 18 The entry 196 allows passengers access to a second curved row of five seats 200, and a rear L-shaped bench 202 (FIG. 17). The rear bench 202 of the embodiment in FIG. 17 can seat 4–6 adults comfortably.

An important aspect of the MOV 13 shown in FIGS. 16, 17 and 18 is a low floor, which facilitates "elevator-like" platform loading (no stepping down or stepping up is required). Platform loading is a big advantage to the handicapped, and makes loading/unloading easier for everyone.

As described above, it is thus seen that the present embodiment provides an efficient, viable, safe, roadway-powered all electric vehicle that uses, with only minor modification, the existing network of highways, roadways, and/or garaging/parking facilities that are already in place to service ICE vehicles.

Further, it is seen that the RPEV system disclosed provides a zero-emission electric vehicle system wherein the RPEV's of the system may be recharged while such RPEV's are in operation within the system. Hence, the RPEV's need not be taken out of service from the system in order to be recharged, as is common with prior art battery-storage type EV's.

Moreover, as seen from the above description, numerous additional features may be used to enhance the RPEV system, such as the inclusion of: (1) an onboard power meter; (2) a wide bandwidth communications channel to allow information signals to be sent to, and received from, the RPEV while it is in use; (3) automated garaging that couples power to the RPEV for both replenishing the onboard energy source and to bring the interior climate of the vehicle to a comfortable level before the driver and/or passengers get in; (4) electronic coupling between "master" and "salve" RPEV's in order to increase passenger capacity; (5) inductive heating coils at a passenger loading/unloading zone in order to increase passenger safety; and (6) an ergonomically designed passenger compartment in which passengers may travel safely and comfortably.

While the invention herein disclosed has been described by means of specific embodiments and applications thereof, numerous modifications and variations could be made thereto by those skilled in the art without departing from the scope of the invention set forth in the claims.

What is claimed is:

1. An electric vehicle comprising:

a vehicle frame supported by a suspension system;

an onboard power receiving module coupled to said vehicle frame that receives electrical power coupled thereto from a power transmitting module by which the electric vehicle passes;

an onboard energy storage means for storing and delivering electrical energy;

an electric drive means coupled to the suspension system; and an onboard power controller means for receiving electrical power from said onboard power receiving module and directing it to said onboard energy storage means, and for selectively delivering electrical energy from said onboard energy storage means to said electric drive means in order to provide operating power for the electric vehicle.

2. An electric vehicle (EV) comprising:

a vehicle frame supported by a suspension system;

an onboard power receiving module mounted on an underneath side of said vehicle frame that receives electrical power coupled thereto from a power transmitting module over which the EV is positioned;

a power conditioner coupled to the power transmitting module;

an onboard energy storage means for storing and delivering electrical energy;

an electric drive means coupled to the suspension system; and an onboard power controller means for receiving electrical power from said onboard power receiving module and directing it to said onboard energy storage means, and for selectively delivering electrical energy from said onboard energy storage means to said electric drive means in order to provide operating power for said EV.

3. The EV as set forth in claim 2 further including:
an onboard power meter electrically connected to the onboard power receiving module to monitor the electrical power received through said onboard power receiving module from said power transmitting module, said onboard power meter thereby providing a measure of the amount of electrical power that has been coupled to the EV; and
demodulation means coupled to said onboard power receiving module to demodulate a communication signal included with the electrical power received by the onboard power receiving module, said communication signal being directed to said onboard power controller means to provide information to said onboard power controller means that it uses to operate said EV more efficiently and/or more safely.

4. The EV as set forth in claim 3 wherein there are included a plurality of sensors in a ground over which the EV travels that monitor whether the ground has ice or moisture thereon, said sensors being spaced apart from each other by at least approximately 300 m, each of said sensors generating a sensor signal that identifies each sensor and provides an indication of whether snow or moisture is present at such identified sensor, said sensor signal being coupled to the power transmitting module and comprising the communication signal that is transmitted to the EV with the electrical power received by the onboard power receiving module, whereby each EV receives an indication of whether ice or moisture is present at a location on the ground corresponding to the identified sensor.

5. The EV as set forth in claim 4, wherein said EV includes modulation means for modulating an EV identification signal that identifies a particular EV, and onboard transmitting means for transmitting the EV signal to a numbered receiver located by each of said power transmitting modules, each of said numbered receivers being linked to a communication station, whereby the communication station can determine when the particular EV is located near the numbered receiver.

6. The EV as set forth in claim 2 wherein said onboard power controller means includes means for generating a set of control signals that control how said EV is being operated, and coupling means for coupling said set of control signals to a second EV, said second EV including means for electronically responding to said set of control signals so that the second EV is operated as controlled by said set of control signals, whereby said second EV follows said EV.

7. The EV as set forth in claim 6 wherein coupling means comprises a flexible cable that is connected between said EV and said second EV through which said set of control signals are transferred from the EV to the second EV.

8. The EV as set forth in claim 7 wherein said coupling means further includes an rf transmitter carried onboard said EV through which said set of control signals are transmitted, and wherein said second EV includes an onboard receiver through which the set of control signals transmitted from said EV are received.

9. The EV as set forth in claim 2 wherein said EV comprises a multiple occupancy vehicle (MOV) adapted for transporting at least 15 passengers, and wherein said MOV includes a passenger compartment that includes:
a door system that includes a side door that slides open and an upper door that swings up, thereby increasing the vertical entry space afforded a passenger entering or exiting said MOV through said door system; and
a seating arrangement that includes two rows of chairs set in a curved pattern.

10. A roadway-powered electric vehicle (RPEV) system comprising:
a network of highways and roadways that have been electrified with a multiplicity of roadway power transmitting modules embedded in the highways and roadways at select locations, each of said roadway power transmitting modules being connected to receive power from an electrical utility;
a plurality of RPEVs for traversing said network of highways and roadways using electrical power coupled to said RPEVs from the electrified highways and roadways as said RPEVs travel over the locations of the highways and roadways that have been electrified; and
communication means for establishing a communication channel with each of said plurality of RPEVs that transfers communication signals to and from said RPEVs through the electrified highways and roadways.

11. The RPEV system as set forth in claim 10 wherein each of said plurality of RPEVs includes an onboard power meter connected to monitor the amount of electrical power coupled from the electrified highways and roadways.

12. The RPEV system as set forth in claim 11 wherein the onboard power meter is coupled to said communication means and the amount of electrical power monitored by said onboard power meter are included within the communication signals transferred through said communication channel.

13. The RPEV system as set forth in claim 10 wherein the network of highways and roadways includes parking/garaging locations, and further wherein said parking/garaging locations are electrified with a power transmission module connected to receive power from the electrical utility.

14. The RPEV system as set forth in claim 13 further including a charging control circuit coupled to the power transmission module, said charging control circuit including means for sensing the presence of a parked RPEV at the parking/garaging locations, and means for automatically coupling power to the parked RPEV only at preselected times during the day when power rates from the electrical utility are the lowest.

15. The RPEV system as set forth in claim 14 wherein the charging control circuit at each parking/garaging location further includes means for coupling power to the parked RPEV in one of two coupling modes: a first coupling mode that couples 200 W to 500 W of electrical power to the parked RPEV on command, and which coupled electrical power is used by the RPEV to bring the interior temperature of the RPEV to a comfortable level; and a second coupling mode that couples 6 kW to 10 kW of electrical power to the RPEV over a one to four hour time period at the preselected times during the day when power rates are the lowest, which coupled electrical power is used to replenish an onboard energy storage system of the parked RPEV.

16. The RPEV system as set forth in claim 15 wherein said charging control circuit further includes a communication receiver for receiving a command signal that automatically begins said first coupling mode.

17. The RPEV system as set forth in claim 10 wherein said communication channel comprises power lines used by the electrical utility to distribute electrical power to the roadway power transmitting modules and elsewhere.

18. The RPEV system as set forth in claim 10 wherein said communication channel comprises commercial communication lines provided by telecommunication providers.

19. The RPEV system as set forth in claim 10 wherein said communication channel comprises dedicated wide bandwidth communication lines installed to connect each of said roadway power transmitting modules with a central monitoring location.

20. The RPEV system as set forth in claim 10 wherein said communication channel further includes means embedded in highways and roadways for establishing a communication link with each of the plurality of RPEVs when said RPEV is over non-electrified portions of said highways and roadways, whereby continuous communications are made with said RPEV as it traverses said network of highways and roadways, whether on electrified or non-electrified portions of the network of highways and roadways.

21. The RPEV system as set forth in claim 10 wherein said roadway power transmitting modules receive 3-phase, 50/60 Hz electrical power from the electrical utility, and wherein a power conditioner converts the 3-phase, 50/60 Hz electrical power from the electrical utility to a 1-phase, 2500–3500 kHz electrical power for use by said roadway power transmitting modules, said RPEV system further comprising heater means embedded in the surface structure along the side of the highway or roadway adjacent selected ones of said roadway power transmitting modules, said heater means being powered by electrical power from the power conditioner to prevent the formation of ice and the accumulation of snow at the location of said heater means.

22. An electric vehicle comprising:

a vehicle frame supported by a suspension system;

an onboard power receiving module coupled to said vehicle frame that receives electrical power coupled thereto from a power transmitting module, which the electric vehicle passes by;

an onboard energy storage means for storing electrical energy;

an electric drive means coupled to the suspension system; and an onboard power controller means for receiving electrical power from said on-board power module and directing it to said energy storage means;

wherein said energy storage means is used as a generator.

23. The electric vehicle of claim 22 wherein the onboard energy storage means is an electromagnetic battery.

24. The electric vehicle of claim 22 wherein the generator produces ac power.

25. The electric vehicle of claim 22 further including:

a second electric vehicle;

wherein the onboard energy storage means of the second electric vehicle is used as a second generator.

26. The electric vehicle of claim 25 wherein the generator and the second generator produce ac power.

27. The electric vehicle of claim 22 further including a power conditioner.

* * * * *